United States Patent
Charlon et al.

(10) Patent No.: US 9,306,618 B2
(45) Date of Patent: Apr. 5, 2016

(54) FILTER ENHANCER AND METHOD

(71) Applicant: Scintera Networks LLC, Wilmington, DE (US)

(72) Inventors: Olivier Charlon, San Francisco, CA (US); Qian Yu, Santa Clara, CA (US)

(73) Assignee: Scintera Networks LLC, Wilmington, DE (US)

( * ) Notice: Subject to any disclaimer, the term of this patent is extended or adjusted under 35 U.S.C. 154(b) by 93 days.

(21) Appl. No.: 14/028,266

(22) Filed: Sep. 16, 2013

(65) Prior Publication Data

US 2015/0078226 A1 Mar. 19, 2015

(51) Int. Cl.
*H04B 1/525* (2015.01)

(52) U.S. Cl.
CPC ....................... *H04B 1/525* (2013.01)

(58) Field of Classification Search
None
See application file for complete search history.

(56) References Cited

U.S. PATENT DOCUMENTS

| | | | | |
|---|---|---|---|---|
| 5,859,870 | A * | 1/1999 | Tsujimoto | 375/143 |
| 8,468,188 | B1 * | 6/2013 | Lam | 708/319 |
| 8,548,037 | B1 * | 10/2013 | Laurent-Michel | 375/232 |
| 8,948,235 | B2 * | 2/2015 | Negus et al. | 375/219 |
| 2005/0245216 | A1 * | 11/2005 | Boos | 455/129 |
| 2008/0242245 | A1 * | 10/2008 | Aparin | 455/126 |
| 2010/0150033 | A1 * | 6/2010 | Zinser et al. | 370/278 |
| 2010/0165895 | A1 * | 7/2010 | Elahi et al. | 370/290 |
| 2010/0278085 | A1 * | 11/2010 | Hahn | 370/286 |
| 2010/0295628 | A1 * | 11/2010 | Lehtinen et al. | 332/144 |
| 2011/0299431 | A1 * | 12/2011 | Mikhemar et al. | 370/277 |
| 2013/0294295 | A1 * | 11/2013 | Viswanathan et al. | 370/278 |
| 2013/0308960 | A1 * | 11/2013 | Horikoshi et al. | 398/209 |
| 2014/0036969 | A1 * | 2/2014 | Wyville et al. | 375/219 |
| 2014/0194073 | A1 * | 7/2014 | Wyville et al. | 455/73 |
| 2014/0269864 | A1 * | 9/2014 | Aparin | 375/221 |
| 2014/0269991 | A1 * | 9/2014 | Aparin | 375/297 |

* cited by examiner

*Primary Examiner* — Faruk Hamza
*Assistant Examiner* — Cassandra Decker

(57) ABSTRACT

A filter enhancer provides greater performance in a passive filter. The passive filter has an input terminal for receiving a signal in a first frequency band and an output terminal for providing a signal in a second frequency band. The filter enhancer includes: (a) a first canceller circuit coupled between input terminal and output terminal, the first canceller circuit including a first finite impulse response (FIR) filter for attenuating signals in the first frequency band; and (b) a control circuit coupled to output terminal and first canceller circuit for providing adaptive coefficients for configuring the first FIR filter. The first FIR filter may be implemented by either a digital FIR filter or an analog FIR filter. The filter enhancer may further include a second canceller circuit coupled between input terminal and output terminal, the second canceller circuit including a second FIR filter for attenuating signals in the second frequency band.

25 Claims, 18 Drawing Sheets

(a) PA OUTPUT (b) RECEIVER INPUT (BEFORE CANCELLATION)

(c) RECEIVER INPUT (AFTER CANCELLATION)

DIRECT

TRANSPOSE $$\frac{Y(z)}{X(z)} = H(z) = a_0 + a_1 z^{-1} + a_2 z^{-2} + \cdots$$

DUAL ENHANCED DUPLEXER
SIMPLIFIED BLOCK DIAGRAM

| Fig. 19A | Fig. 19B |

FILTER ENHANCER AND METHOD

BACKGROUND OF THE INVENTION

1. Field of the Invention

The present invention relates generally to radio frequency (RF) isolation filters. In particular, the present invention relates to RF isolation filters used in passive components used in conjunction with RF transceivers, such as duplexers, diplexers or other filters types.

2. Discussion of the Related Art

FIG. 1 shows transceiver duplexer circuit 100 in an RF application. As shown in FIG. 1, transceiver circuit 100 receives an RF signal at transmitter input terminal 107. The RF signal is amplified by RF power amplifier 103 for transmission. In one typical application, RF power amplifier 103 provides +50 dBm signal power in the transmitter frequency band and unwanted intermodulation (IM) products or noise of −15 dBm in the receiver frequency band. The amplified RF signal is received into input terminal 108 of duplexer 101, where the signal is provided to antenna 102 for transmission. Antenna 102 serves both the transmitter and the receiver. An RF signal picked up by antenna 102 is received into duplexer 101, which provides the received signal at output terminal 109 of duplexer 101. The isolation between antenna 102 and duplexer input terminal 108 may provide, for example, an attenuation of 110 dB in the receiver frequency band. The isolation between antenna 102 and duplexer output terminal 109 may provide, for example, a −50 dBm power leakage in the transmitter frequency band and a −125 dBm power leakage in the intermodulation products (or noise) in the receiver frequency band. A typical isolation between duplexer input terminal 108 and duplexer output terminal 109 may be, for example, 100 dB in the transmission frequency band and 110 dB in the receiver frequency band, with a sensitivity of less than −115 dBm in the receiver frequency band. The received RF signal at duplexer output terminal 109 may be amplified by low noise amplifier (LNA) 104. As shown in FIG. 1, the amplified received signal is further filtered in receiver filter 105. The filtered signal is provided to a receiver at terminal 106.

Passive duplexer 101 has the disadvantages of being both costly and bulky, and requires manual tuning in order to achieve acceptable frequency selectivity and insertion loss.

SUMMARY

According to one embodiment of the present invention, a filter enhancer is provided for a passive isolation filter. The passive filter has an input terminal for receiving a signal in a first frequency band and an output terminal for providing a signal in a second frequency band. The filter enhancer includes: (a) a first canceller circuit coupled between the input terminal and the output terminal, the first canceller circuit including a first finite impulse response (FIR) filter for attenuating signals in the first frequency band; and (b) a control circuit coupled to the output terminal and the first canceller circuit for providing adaptively coefficients for configuring the first FIR filter. The first FIR filter may be implemented by either a digital FIR filter or an analog FIR filter. The filter enhancer may further include a second canceller circuit coupled between the input terminal and the output terminal, the second canceller circuit including a second FIR filter for attenuating signals in the second frequency band.

According to one embodiment of the present invention, the filter enhancer is provided for a passive duplexer, wherein the input terminal of the passive duplexer is coupled to a transmitter, wherein the output terminal of the passive duplexer is coupled to a receiver, and wherein the first frequency band includes signals output from the transmitter and wherein the second frequency band includes signals to be received into the receiver.

According to one embodiment of the present invention, a down-converter between the input terminal of the passive filter and the first canceller circuit is provided to down-convert a signal at the input terminal of the passive-filter from a frequency in the first frequency band to an intermediate or baseband frequency, and an up-converter between the first canceller circuit and the output terminal of the passive filter is provided to up-convert an output signal from the first canceller circuit from intermediate or baseband frequency to the frequency in the first frequency band. A phase-locked loop may provide a carrier signal for the down-conversion and the up-conversion at the frequency in the first frequency band. The signal at the input terminal of the passive filter may be processed in the filter enhancer as in-phase and quadrature signals.

According to one embodiment of the present invention, the filter enhancer circuit may include sample-and-hold circuits and analog FIR filters. Alternatively, the filter enhancer may include analog-to-digital circuits, digital FIR filters and digital-to-analog circuits.

According to one embodiment of the present invention, various transmit or receiver filters may be inserted in the canceller data paths to match the delay across the passive filter.

According to one embodiment of the present invention, the filter enhancer may include a tone injection circuit for introducing signals through the passive filter for testing and calibration purposes.

According to one embodiment of the present invention, a rusty bolt effect is canceled by using a polynomial function circuit coupled to the input terminal of the passive filter for generating cancellation signals to passive intermodulation products, a filter for filtering the cancellation signals, and a summer for combining the filtered cancellation signals with signals at the output terminal of the passive filter.

Thus, relative to the prior art, RF filters of the present invention have reduced sizes and weights, reduced duplexer cost, and lower duplexer insertion loss. Lower duplexer insertion loss results in increased transmitter efficiency and improved receiver sensitivity.

The present invention is better understood upon consideration of the detailed description below and the accompanying drawings.

BRIEF DESCRIPTION OF THE DRAWINGS

To simplify and facilitate the detailed description, like elements in the figures are assigned like reference numerals.

DETAILED DESCRIPTION OF THE PREFERRED EMBODIMENTS

Figure 1:
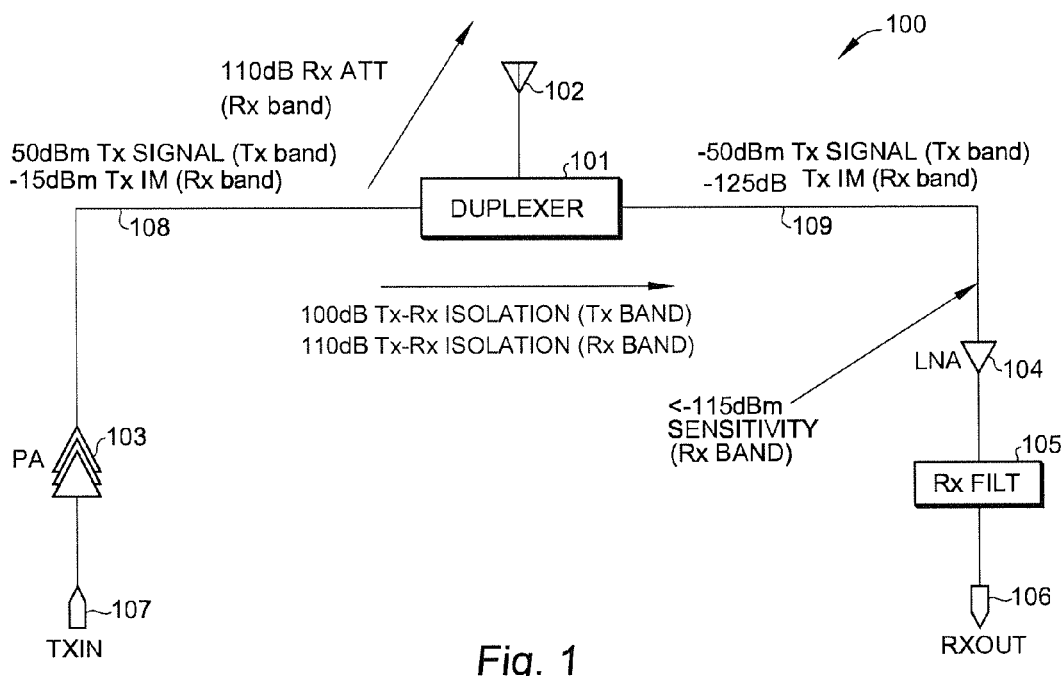
FIG. 1 shows transceiver duplexer circuit 100 in an RF application.
Figure 2:
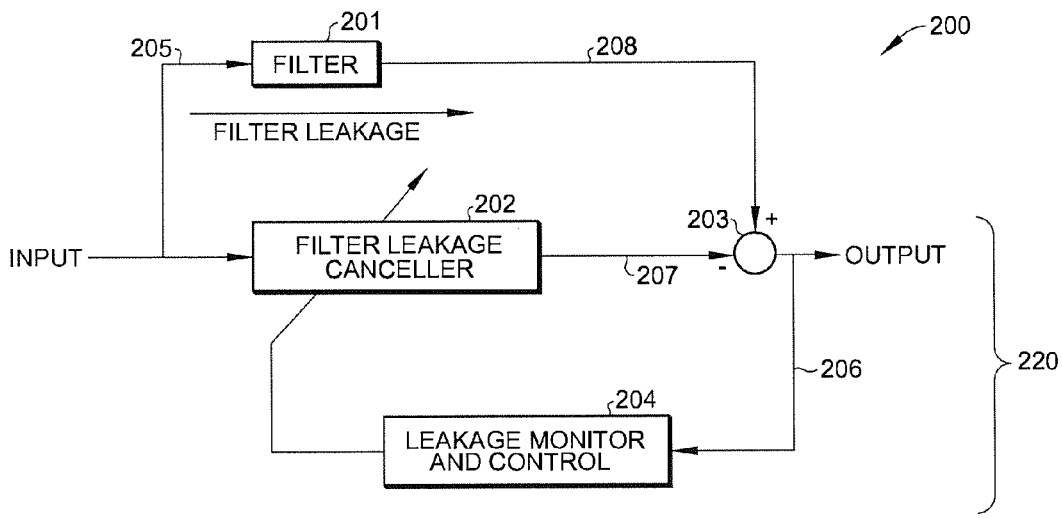
FIG. 2 is a block diagram of filter enhanced circuit 200, in accordance with one embodiment of the present invention.

The present invention provides a filter enhancer for improving performance of a duplexer circuit (e.g., duplexer 101 of FIG. 1). FIG. 2 is a block diagram of filter enhanced circuit 200, in accordance with one embodiment of the present invention. As shown in FIG. 2, filter enhanced circuit 200 includes filter 201, which receives an input signal at terminal 205 and a filtered signal at terminal 208. In this detailed description, filter 201 is exemplified by a passive duplexer circuit in an RF application that includes an input terminal for receiving from a transmitter an RF signal to be transmitted, a bidirectional antenna terminal which serves both transmission and reception, and an output terminal for providing an RF signal to a receiver. The RF signal to be provided to the receiver is picked up by the antenna coupled to the antenna terminal. To enhance isolation between the transmitter and the receiver across filter 201, leakage in filter 201 is canceled by leakage canceller 202. Cancellation is achieved by subtracting, at summer 203, the output signal of leakage canceller 202 at terminal 207 from the filtered signal of filter 201 (at terminal 208) to provide an output signal terminal 206. Cancelling filter leakage by filter leakage canceller 202 enhances filter attenuation in the stop band. The output signal at terminal 206 is fed back to leakage monitor and control circuit 204, which measures any residual leakage and provides therefrom, adaptive parameter adjustments to optimize leakage canceller 202. To achieve effective cancellation, leakage canceller 202 preferably matches both the delay and the amplitude response of filter 201 over the bandwidth or bandwidths of interest. Leakage canceller 202 may be implemented using one of many techniques, such as an analog FIR filter (e.g., a filter that is based on switched capacitors), or a digital FIR filter. Leakage canceller 202, summer 203 and leakage monitor and control circuit 204 form filter enhancer circuit 220.

Figure 3:
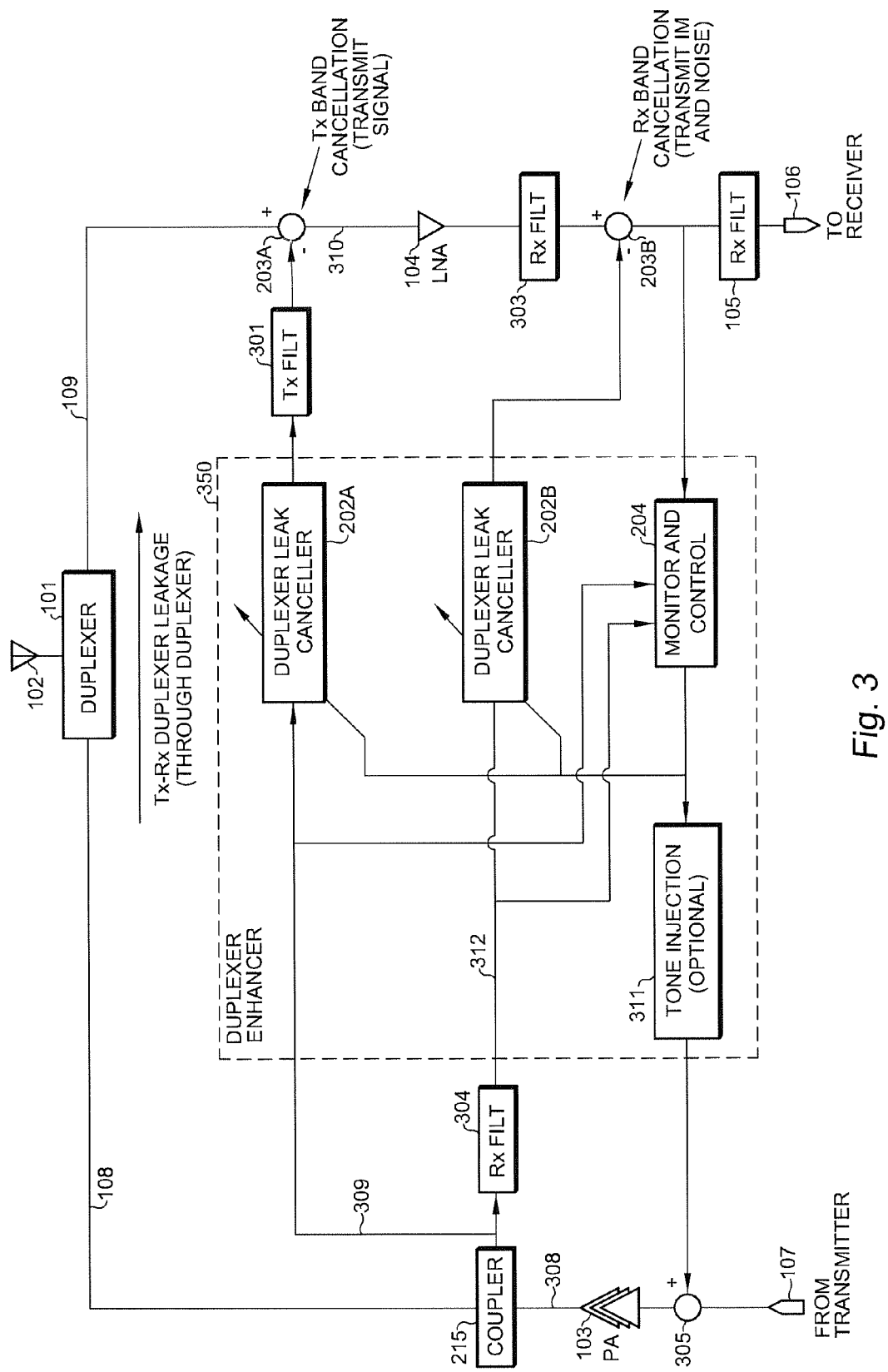
FIG. 3 shows transceiver duplexer circuit 300, which includes filter enhancer circuit 350, in accordance with one embodiment of the present invention.

FIG. 3 shows transceiver duplexer circuit 300, which includes filter enhancer circuit 350, in accordance with one embodiment of the present invention. Filter enhancer circuit 350 may be, for example, an implementation of filter enhancer 220 of FIG. 2. As shown in FIG. 3, power amplifier 103 amplifies the input signal at terminal 107 for transmission. The amplified signal at terminal 308 includes the RF signal to be transmitted, as well as intermodulation (IM) products, noise and other any undesirable signals (e.g., clock spurs, signal aliasing and harmonics). Coupler 305 couples the amplified signal at terminal 308 to duplexer input terminal 108 and filter enhancer input terminal 309. Coupler 305 may be a large-ratio coupler, which allows extraction of the amplified signal at the output terminal of power amplifier 103 without adversely affecting the output power of power amplifier 103. Duplexer 101 filters the amplified signal at input terminal 108 prior to transmission over antenna 102, and provides isolation between the transmitter and the receiver. However, some amounts of the signal to be transmitted, the IM products and the noise leak through duplexer 101 to output terminal 109. Leakage in the transmitter frequency band may causes cross-modulation at LNA 104, thereby degrading receiver sensitivity, especially if large receiver interferers are present.

Filter enhancer circuit 350 reduces leakage in the transmitter frequency band at the input terminal of LNA 104, using the leakage cancellation techniques of the present invention. The transmitter frequency band leakage is attenuated by leakage canceller 202a, which is a tunable FIR filter whose coefficients are adjustable to match both the delay and the amplitude response of duplexer 101 over the transmitter frequency band. Transmit signal filter 301 filters out noise in the receiver frequency band to prevent degradation of receiver sensitivity. Summer 203a subtracts the output signal of transmit signal filter 301 from the signal at duplexer output terminal 109 to cancel the transmitter frequency band leakage. The resulting signal is provided at input terminal 310 of LNA 104.

Filter enhancer circuit 350 also reduces leakage of the IM products and noise into the receiver frequency band. The IM products and noise that are leaked into the receiver frequency band may jam a desired receiver signal picked up from antenna 102 and may thereby decrease receiver sensitivity. To reduce IM products and noise in the receiver frequency band, receiver band filter 304 filters the coupled signal at terminal 309 to remove its transmitter frequency band content. The resulting signal includes primarily the IM products and noise, which are removed by leakage canceller 202b. Leakage canceller 202b may be implemented by a tunable FIR filter whose coefficients are adjustable to match the delay and the amplitude response of duplexer 101 over the receiver frequency band. To further suppress the transmitter signal and to match the delay at receiver band filter 304, receiver filter 303 may be inserted at the output terminal of LNA 104. Accurate matching by receiver band filter 304 and receiver filter 303 is not required for every instance, as the error in delay matching may be cancelled by fine delay and amplitude response adjustments at leakage canceller 202b. Summer 203b subtract the output signal of leakage canceller 202b from the signal at the output terminal of receiver filter 303 to cancel the IM products and noise leakage of duplexer 101.

Optionally, receiver filter 105 further attenuates any residual transmitter signal. Receiver filter 105 also helps to reduce any spurious signal generated in leakage canceller 202b. Receiver filter 303 may be placed either before or after LNA 104. Receiver band filter 304 may be placed after leakage canceller 202b. In that case, however, another receiver band filter may be provided at the output terminal of LNA 104 to match the delay between the signal path from duplexer output terminal 109 and leakage canceller 202b.

Monitor and control circuit 204 provides the FIR filter coefficients for both leakage cancellers 202a and 202b, which are adaptively adjusted to match the delays and the amplitude responses of duplexer 101 in the transmitter frequency band and the receiver frequency band. Adaptation may be achieved by evaluation of a cost function (e.g., using a constraint optimization). Monitor and control circuit 204 receives the output signal at summer 203b and the signals at input terminals 309 and 312 of leakage canceller 202a and leakage canceller 202b. One adaptation sets filter coefficients in leakage canceller 202a and 202b to minimize power in the transmitter frequency band and power in the receiver frequency band, respectively. In one implementation, to detect the locations of the residual leakage signals, monitor and control circuit 204 performs signal processing in the frequency domain.

Optional tone injection circuit 311 allows test signals to be injected during calibration and testing under controlled conditions. Such test tones are preferably applied outside the receiver frequency band to avoid jamming the desired receiver signal. Test tones have the advantage that their power may be integrated over time to improve the signal-to-noise ratio (SNR). When test tones are injected within the receiver frequency band, the integrated power over a channel is preferably low to prevent degradation of receiver sensitivity. For example, test tones in the receiver frequency band may be sent with relatively high power, but with short durations so as to ensure a low integrated power.

Figure 4:
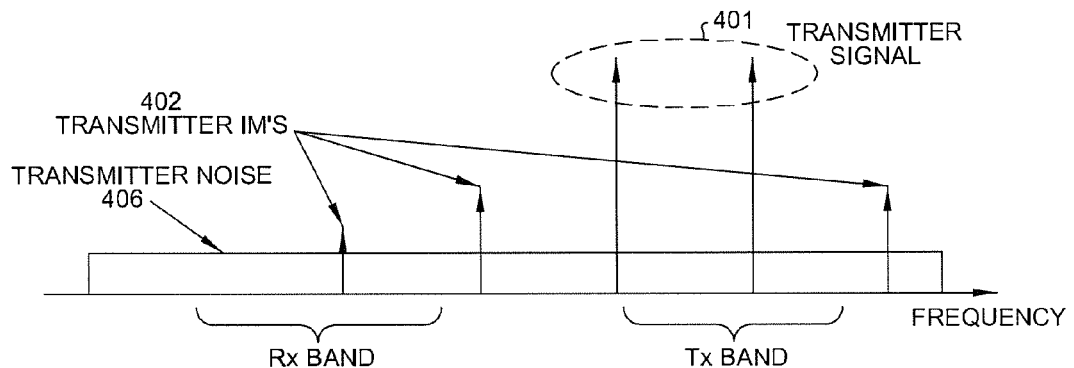
FIGS. 4(a), 4(b) and 4(c) show the signal spectra at duplexer input terminal 108, duplexer output terminal 109 and receiver input terminal 106, respectively.
Figure 4:
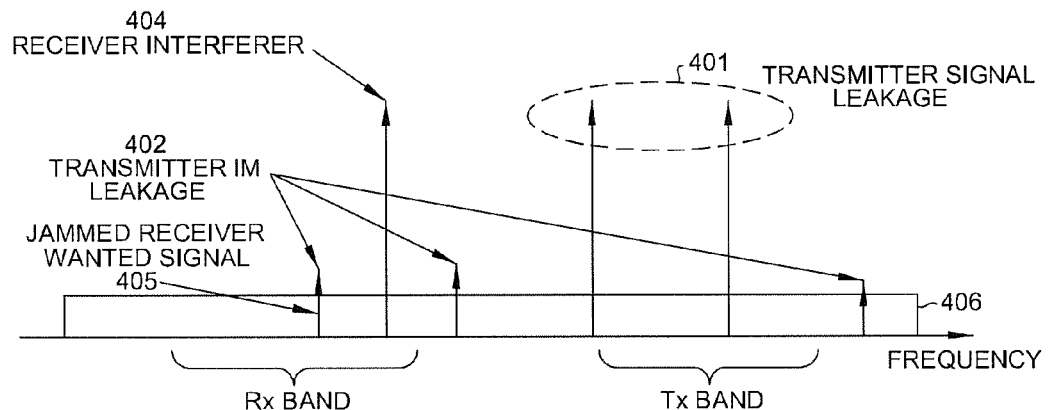
Figure 4:
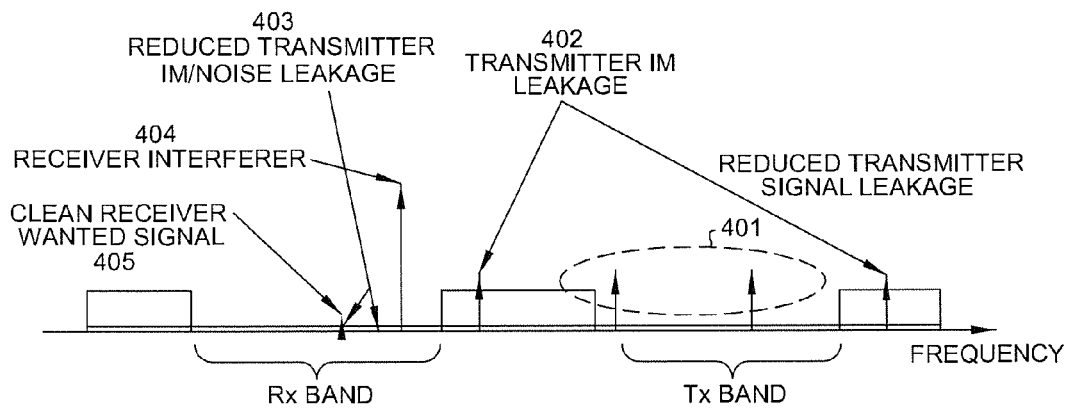

FIGS. 4(a), 4(b) and 4(c) show the signal spectra at duplexer input terminal 108, duplexer output terminal 109 and bidirectional antenna terminal 106, respectively. As shown in FIG. 4(a), the signal at duplexer input terminal 108—which receives the output signal of power amplifier 103—includes transmitter signal 401, transmitter IM components 402 and transmitter noise 406. Transmitter signal 401 is within the transmitter frequency band, while some portions of transmitter IM components fall within the receiver frequency band. Transmitter noise 406 is shown in FIGS. 4(a) and 4(b) as substantially "white." As shown in FIG. 4(b), the signal at duplexer terminal 109 includes the signal components shown in FIG. 4(a), but attenuated. The attenuated signals are leakage from duplexer input terminal 108 to duplexer output terminal 109. In addition, as the signal at duplexer output terminal 109 includes RF signals received over antenna 102, the spectra in FIG. 4(b) includes desired signal 405 and receiver interferer signal 404 in the receiver frequency band.

FIG. 4(c) shows the signal spectrum at receiver input terminal 106, where the effects of the leakage cancellation by leakage cancellers 202a and 202b are included. As the transmitter leakage signals (i.e., attenuated transmitter signal 401) are relative large, they can easily be detected and canceled. Thus, as shown in FIG. 4(c), transmitter signal 401 in the transmitter frequency band is readily canceled. Transmitter IM components and noise leakage in the receiver frequency band are more challenging, as these signals tend to be small and may overlap with the desired signal for the receiver or interferers entering into the system from antenna 102. As monitor and control circuit 204 of FIG. 3 performs cancellation based on input signals from the transmitter side (i.e., terminal 309 and 312), receiver interferer signal 404—which enters the system via antenna 102—is not canceled.

Figure 5:
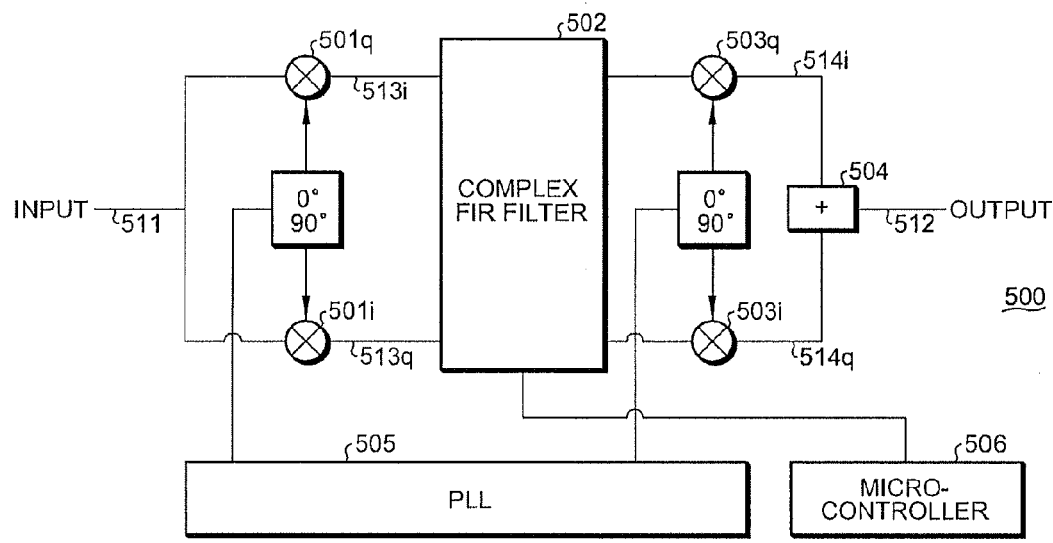
FIG. 5 is a block diagram showing canceler circuit 500, in accordance with one embodiment of the present invention.

Leakage cancelers 202a and 202b may be each implemented in any of multiple ways. FIG. 5 is a block diagram showing canceller circuit 500, in accordance with one embodiment of the present invention. As shown in FIG. 5, canceller circuit 500 receives at terminal 511 an input signal (e.g., the signal at terminal 309 or the signal at terminal 312). The signal at terminal 511 is first down-converted to quadrature signals 513i and 513q centered at an intermediate frequency (IF) or baseband (DC). Down-conversion is carried out using a quadrature down-converter that includes mixers 501i and 501q driven by a local oscillator signal generated by phase-locked loop 505. Down-converted quadrature signals 513i and 513q are then provided to complex FIR filter 502 for leakage cancellation. Controller circuit 506 (e.g., a microcontroller) sets the coefficients of complex FIR filter 502. The processed signals from FIR filter 502 are then up-converted back to the same frequency as the input signal at terminal 511 using a quadrature up-converter, which includes mixers 503i and 503q, also driven by phase-locked loop 505. The up-converted signals, quadrature signals 514i and 514q, are combined by summer 504 and are provided as the output signal at terminal 512.

Figure 7:
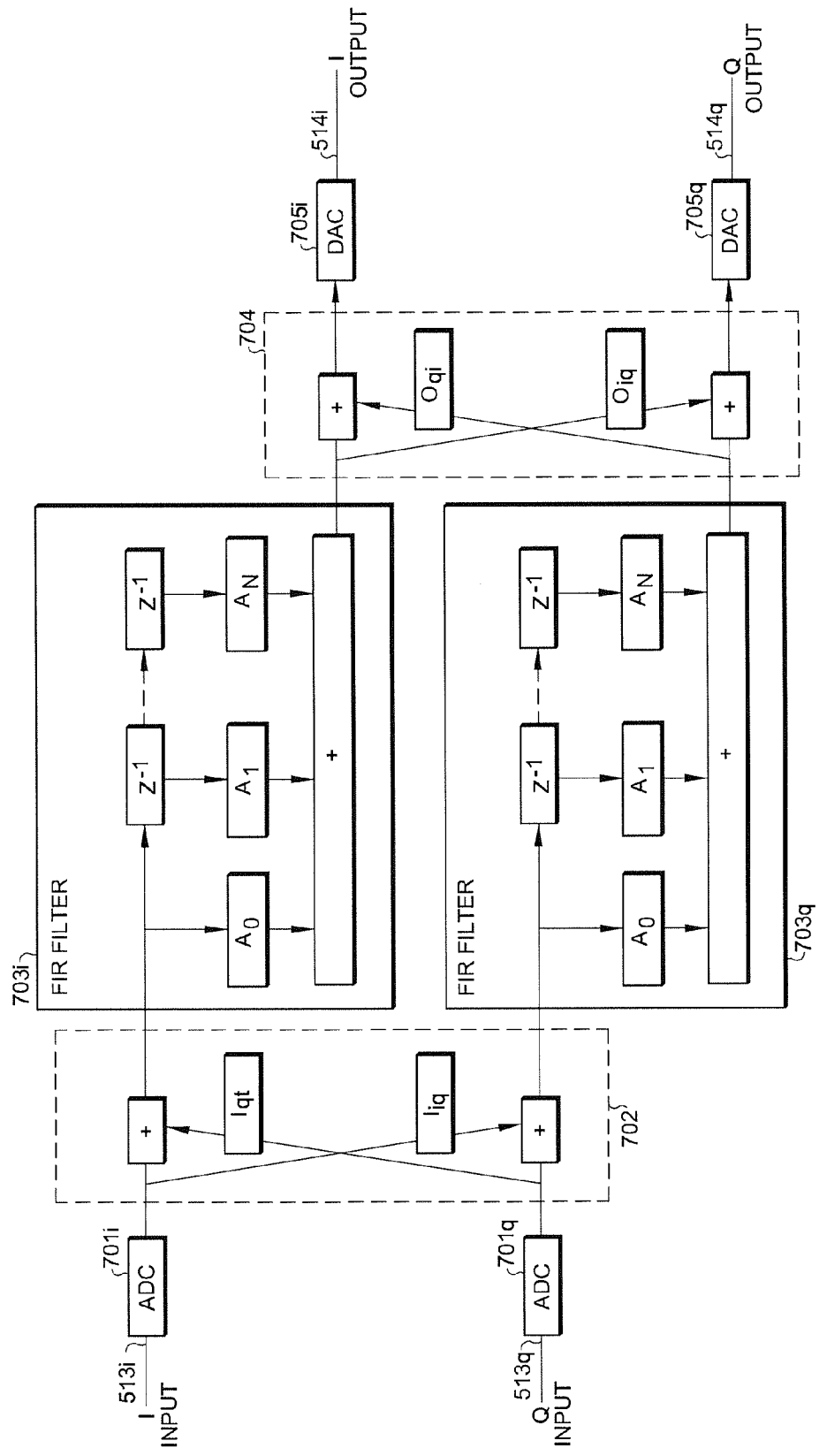
FIG. 7 shows digital circuit 700, which implements complex FIR filter 502 of FIG. 5 in accordance with one embodiment of the present invention.
Figure 8:
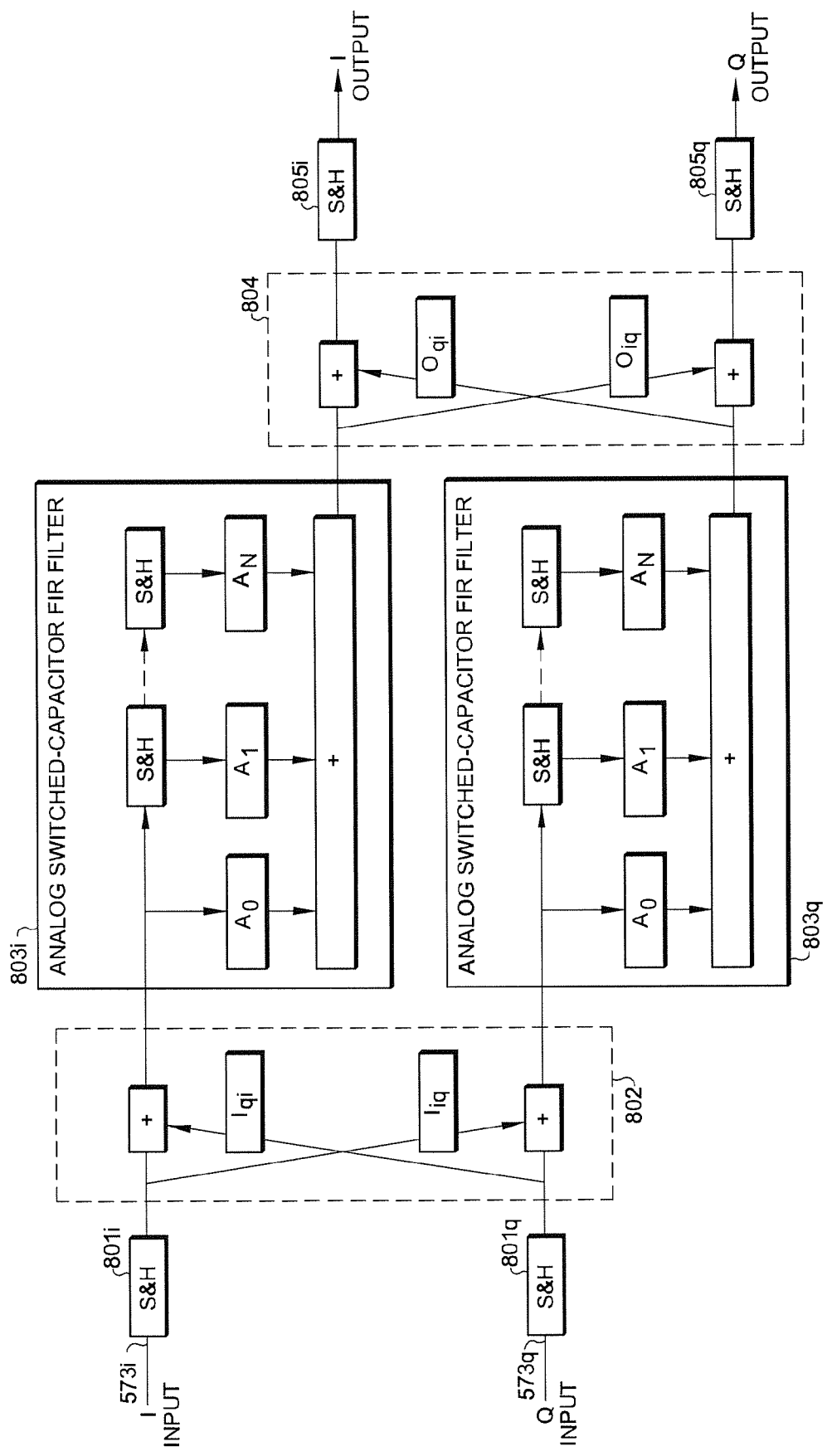
FIG. 8 shows analog circuit 800, which implements complex FIR filter 502 of FIG. 5 in accordance with one embodiment of the present invention.

Both analog and digital circuit implementations are available for complex FIR filter 502. FIG. 7 shows digital circuit 700, which implements complex FIR filter 502 of FIG. 5 in accordance with one embodiment of the present invention. FIG. 8 shows analog circuit 800, which implements complex FIR filter 502 of FIG. 5 in accordance with another embodiment of the present invention.

As shown in FIG. 7, analog quadrature input signals 513i and 513q are received into circuit 700 and digitized at low latency analog-to-digital (ADC) converters 701i and 701q, respectively. Amplitude or phase imbalance introduced by elements of the quadrature down-converter (e.g., mixers 501i and 501q) may be corrected by cross-coupling the output signals of ADCs 701i and 701q. The degree of signal coupling in cross-coupling circuit 702 is controlled by coefficients that are adapted in conjunction with the coefficients of FIR filters 703i and 703q, respectively, which receive the cross-coupled quadrature digital signals. FIR filters 703i and 703q implement the leakage cancellation in the digital domain using unit delay elements (e.g., registers). The output signals from FIR filters 703i and 703q at cross-coupling circuit 703 may then be corrected for phase or amplitude imbalances at up-converter 503i and 503q, before being restored to analog domain in digital-to-analog converters (DAC) 705i and 705q. As in cross-coupling circuit 702, cross-coupling coefficients in cross-coupling circuit 704 may be adapted in conjunction with the coefficients of FIR filters 703i and 703q. As understood by those of ordinary skill in the art, the number of taps in FIR filters 703i and 703q and the sampling rate of ADC 701i and 701q depend on the required filter response and the cancellation bandwidth. Reconstruction filtering may be performed in the RF domain in transmitter and receiver filters, such as transmitter filter 301, receiver filters 303 and 304 discussed above. Alternatively, such reconstruction filtering may also be performed at IF frequency or DC frequency, as the case may be, at the output terminals of DAC 705$i$ and 705$q$.

Figure 9:
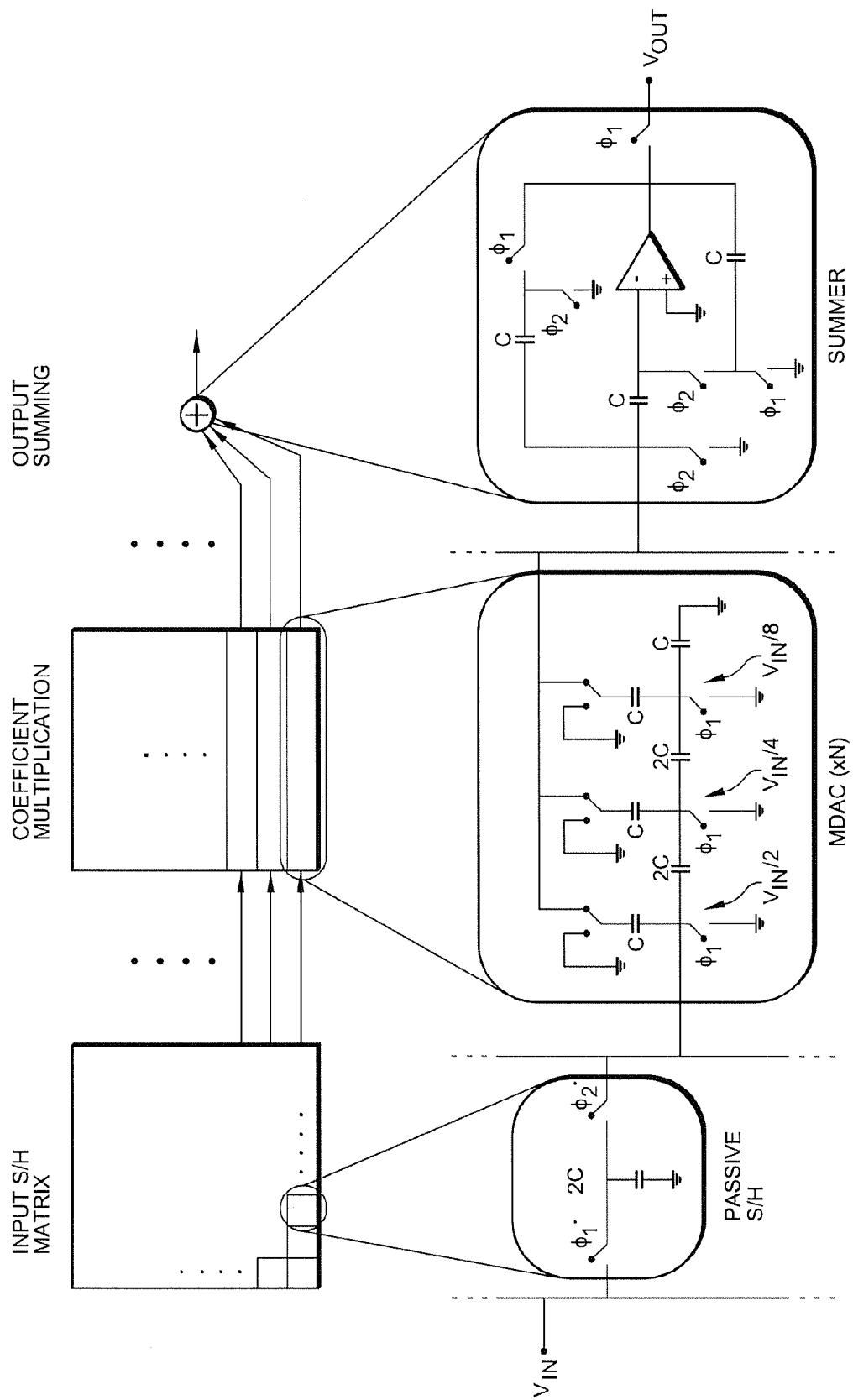
FIG. 9 shows an analog FIR filter architecture for implementing a switched-capacitor analog FIR filter discussed in the Lacy Thesis.

As shown in FIG. 8, analog quadrature input signals 513$i$ and 513$q$ are received into circuit 800 and sampled at sample-and-hold circuits 801$i$ and 801$q$, respectively. Amplitude or phase imbalance introduced by elements of the quadrature down-converter (e.g., mixers 501$i$ and 501$q$) may be corrected by cross-coupling the output signals of sample-and-hold circuits 801$i$ and 801$q$. The degree of signal coupling in cross-coupling circuit 802 is controlled by coefficients that are adapted in conjunction with the coefficients of FIR filters 803$i$ and 803$q$, respectively, which receive the cross-coupled quadrature signals. FIR filters 803$i$ and 803$q$ implement the leakage cancellation in the analog domain using, for example, switched capacitors. Implementations of analog FIR filters are known to those of ordinary skill in the art. For example, such FIRs are discussed in the master's thesis of Cameron B. Lacy ("Lacy Thesis"), entitled "Design of a programmable switched-capacitor analog FIR filter", University of Toronto, 1999. FIG. 9 shows an analog FIR filter architecture for implementing such analog FIR filters discussed in the Lacy Thesis.

The output signals from FIR filters 803$i$ and 803$q$ at cross-coupling circuit 803 may then be corrected for phase or amplitude imbalances at up-converter 503$i$ and 503$q$, before being output to sample-and-hold circuits 805$i$ and 805$q$. As in cross-coupling circuit 802, cross-coupling coefficients in cross-coupling circuit 804 may be adapted in conjunction with the coefficients of FIR filters 803$i$ and 803$q$. As understood by those of ordinary skill in the art, the number of taps in FIR filters 803$i$ and 803$q$ and the sampling rate of sample-and-hold circuits 801$i$ and 801$q$ depend on the required filter response and the cancellation bandwidth. Reconstruction filtering may be performed in the RF domain in transmitter and receiver filters, such as transmitter filter 301, receiver filters 303 and 304 discussed above.

Alternatively, such reconstruction filtering may also be performed at IF frequency or DC frequency, as the case may be, at the output terminals of sample-and-hold circuits 805$i$ and 805$q$.

Figures 6A, 6B:
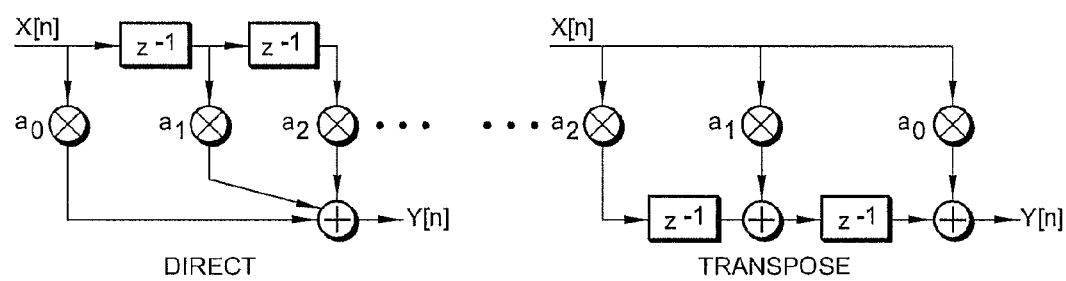
FIGS. 6(a) and 6(b) show the direct and transpose form implementations of an FIR filter, respectively.

Although FIR filters 703$i$, 703$q$, 803$i$ and 803$q$ are each shown in FIGS. 7 and 8 to be implemented in direct form, each of these FIR filters may also be implemented in transpose form. FIGS. 6($a$) and 6($b$) show the direct and transpose form implementation, respectively. Although FIR filters 703$i$, 703$q$, 803$i$ and 803$q$ are shown in FIGS. 7 and 8 as being implemented in pairs of individual filters, the 703$i$/703$q$ and 803$i$/803$q$ filter pairs can be implemented as complex filters. For example, 703$i$ and 703$q$ can be combined into a single complex FIR filter. Similarly, filters 803$i$ and 803$q$ can also be combined into a single complex FIR filter.

Figure 10:
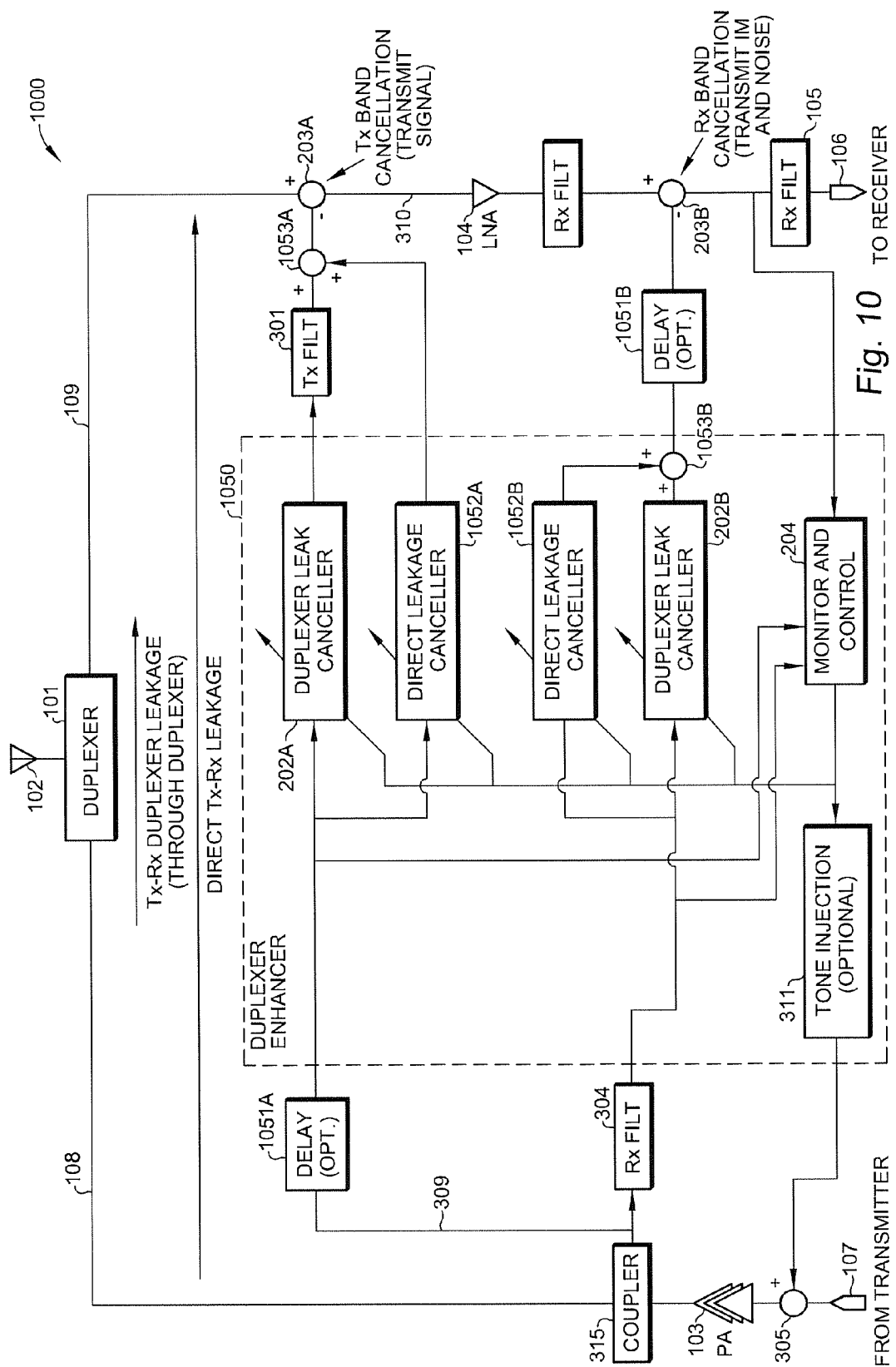
FIG. 10 shows transceiver duplexer circuit 1000 having filter enhancer circuit 1050 that includes direct leakage cancellers 1052a and 1052b for canceling direct transmitter to receiver leakage, in accordance with one embodiment of the present invention.

The transmitter-to-receiver isolation scheme of filter enhancer circuit 350 (FIG. 3) may be compromised if direct leakage occurs across the transmitter-receiver duplexer connectors or on the printed circuit board (e.g., between power amplifier 103's output terminal and LNA 104's input terminal or output terminal). For such leakage, filter enhancer circuit 350 may not be sufficient to provide acceptable performance, since direct leakage occurs outside duplexer 101. Such direct leakage has a very low delay and thus must be cancelled with low latency circuitry. The transmitter signal, transmitter IM components and noise can leak over a direct leakage path to the receiver transmit frequency band and receiver frequency band respectively. Therefore, as shown in FIG. 10, filter enhancer circuit 1050 (which replaces filter enhancer circuit 350 of FIG. 3) includes additional cancellers 1052$a$ and 1052$b$ to cancel this direct transmitter to receiver leakage. Direct leakage canceller 1052$a$ cancels direct leakage of the transmitter signal in transmitter frequency band. Direct leakage canceller 1052$b$ cancels the transmitter IM components and the noise in the receiver frequency band. As shown in FIG. 10, to improve the direct cancellation bandwidth, additional delay elements 1051$a$ and 1051$b$ may be inserted in the cancellation signal paths. If direct leakage is small, the delay introduced by delay elements 1051$a$ and 1051$b$ are negligible and can be canceled by the adaptation of leakage cancellers 202$a$ and 202$b$. If multiple direct leakage paths exist, additional leakage cancellers may be provided in parallel.

Figure 11:
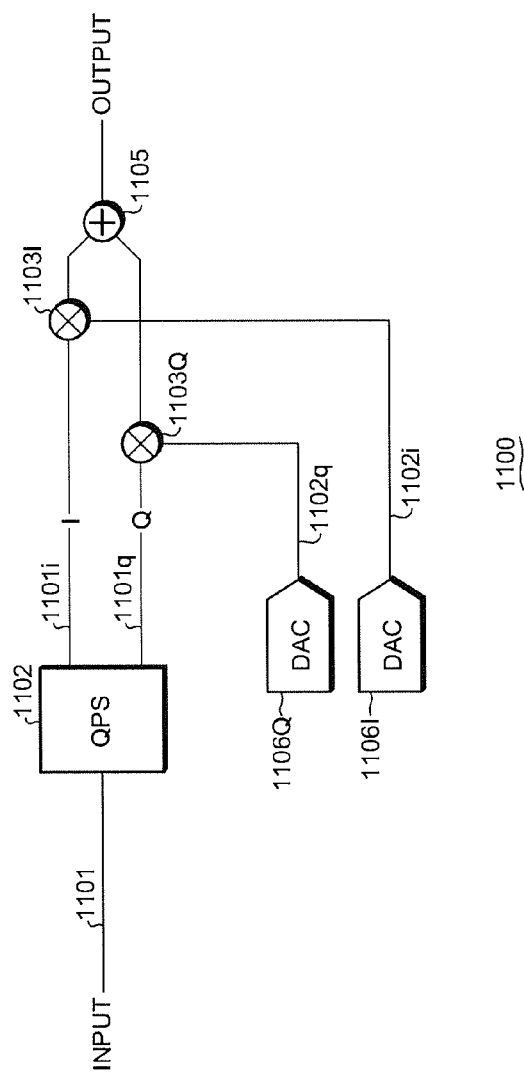
FIG. 11 shows vector modulator circuit 1100 that modifies the gain and the phase of an incoming RF signal, suitable for implementing either of direct leakage cancellers 1052a and 1052b, in accordance with one embodiment of the present invention.
Figure 12A:
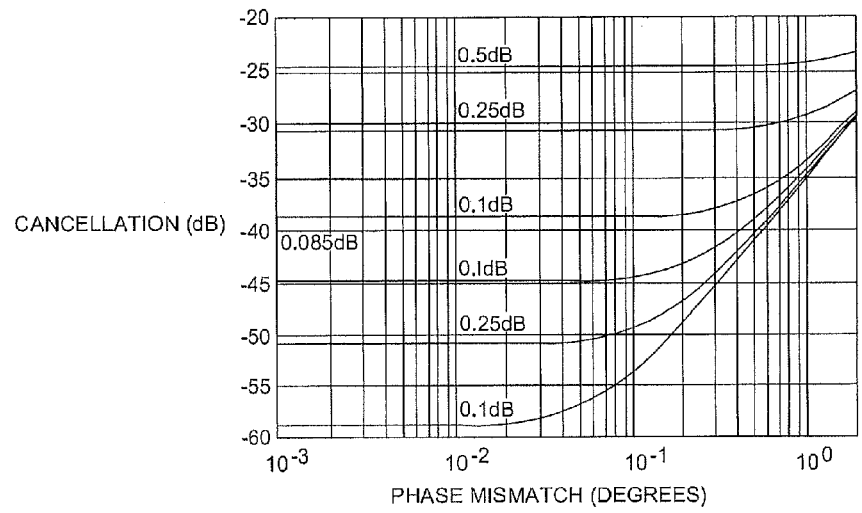
FIG. 12(a) shows achievable cancellation levels in a vector modulator with phase mismatch for different gain mismatch values.
Figure 12B:
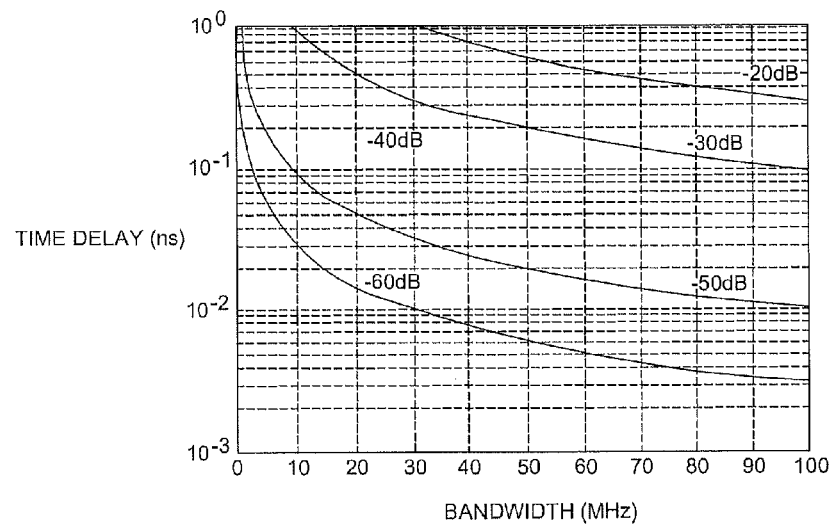
FIG. 12(b) shows time delays in a vector modulator as a function of signal bandwidth for various achievable cancellation levels.

Direct leakage cancellers 1052$a$ and 1052$b$ in filter enhancer circuit 1050 may each be implemented by an RF vector modulator that modifies the gain and the phase of an incoming RF signal, such as vector modulator circuit 1100 of FIG. 11. As shown in FIG. 11, an RF input signal 101 is split into quadrature signals 1101$i$ and 1101$q$ in Quadrature Phase Shifter (QPS) 1102. Output signals 1101$i$ and 1101$q$ of QPS 1102 are multiplied with respective scaler signals 1102$i$ and 1109$q$ in full quadrant multipliers 1103$i$ and 1103$q$ and summed in summer 1105. The scaler signals may be specified digitally and then converted into analog signals in DAC 1106$a$ and 1106$b$. FIG. 12($a$) shows achievable cancellation levels in a vector modulator with phase mismatch for different gain mismatch values. FIG. 12($b$) shows time delays in a vector modulator as a function of signal bandwidth for various achievable cancellation levels.

Figure 13:
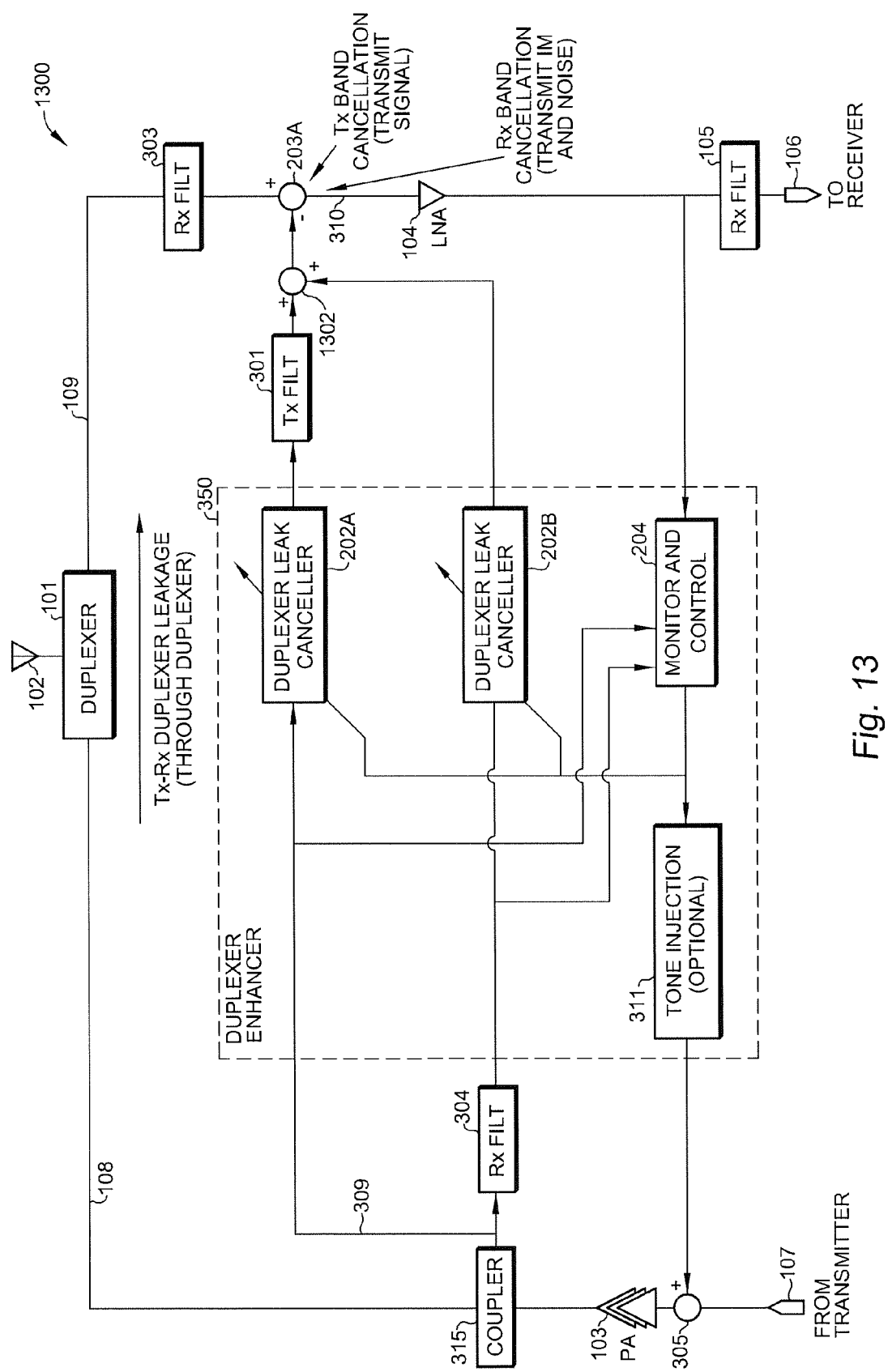
FIG. 13 shows transceiver duplexer circuit 1300 that includes filter enhancer circuit 350, in accordance with one embodiment of the present invention.

FIG. 13 shows transceiver duplexer circuit 1300 that includes filter enhancer circuit 350, in accordance with one embodiment of the present invention. Unlike transceiver duplexer circuit 300 of FIG. 3, transceiver duplexer circuit 1300 combines the transmitter frequency band cancellation path and the receiver frequency band cancellation path at summer 1302 after transmitter filter 301. In this instance, receiver filter 303 is preferably provided prior to summer 203$a$. This configuration may have a lesser receiver sensitivity than transceiver duplexer circuit 300, as receiver filter 303 may have a significant insertion loss. One or both of receiver filters 303 and 304 may not be needed, if the delay in leakage canceller 202$b$ is low. Likewise, transmitter filter 301 may not be needed if the delay in leakage canceller 202$a$ is low.

Figure 14:
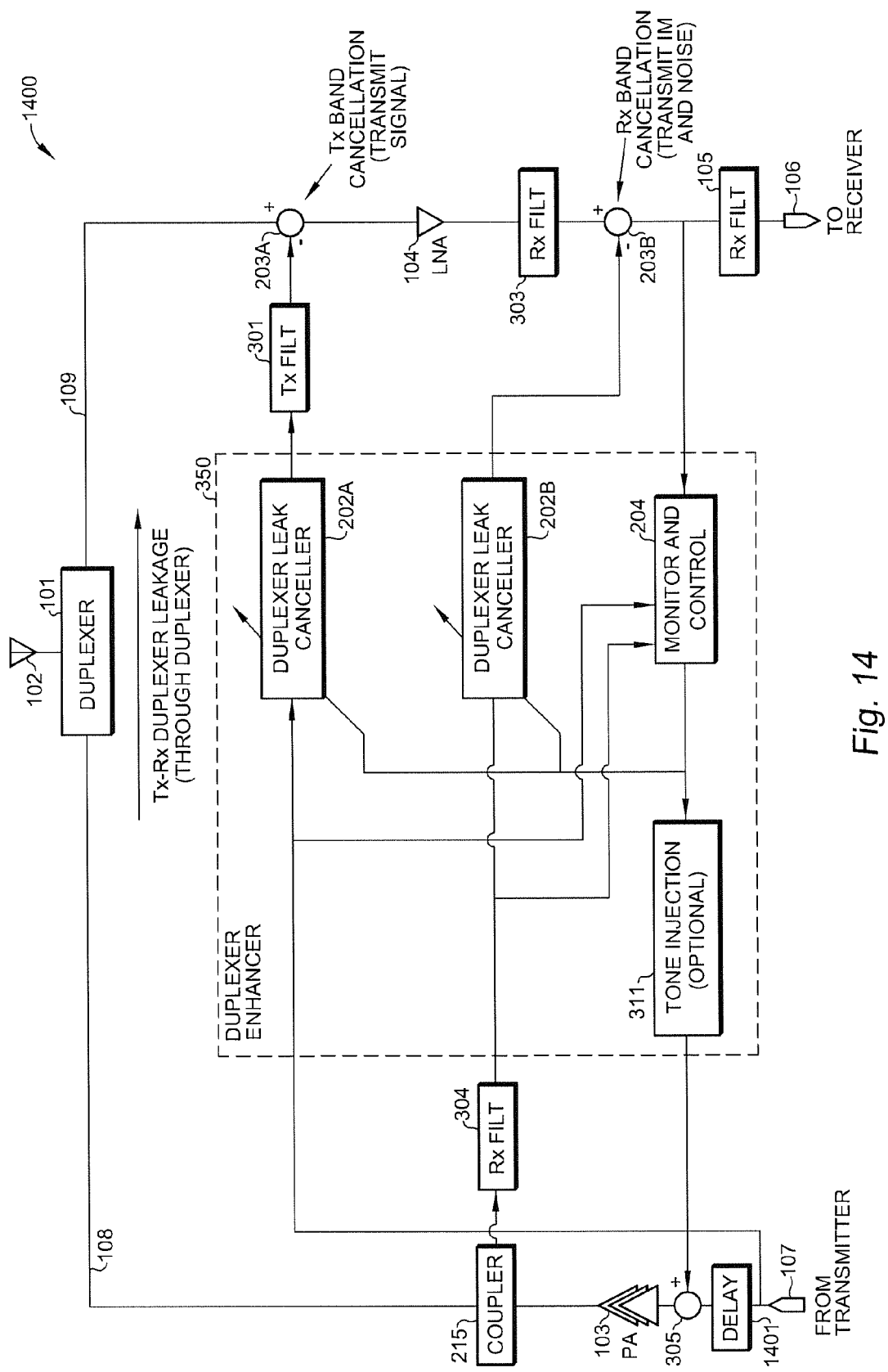
FIG. 14 shows transceiver duplexer circuit 1400 that includes filter enhancer circuit 350, in accordance with one embodiment of the present invention.

FIG. 14 shows transceiver duplexer circuit 1400 that includes filter enhancer circuit 350, in accordance with one embodiment of the present invention. As shown in FIG. 14, the transmitter signal may be sampled at input terminal 107 (rather than, for example, at terminal 309 of FIG. 3) before tone injection from tone injection circuit 311 is introduced at summer 305. In this configuration, a greater delay exists between the transmitter cancellation path and the transfer function of duplexer 101. Delay element 1401 may be inserted after the sampling point at terminal 107 to compensate for transmit filter 301. Delay element 1401 may be implemented by a transmit filter, a coaxial cable, a strip line or any suitable RF delay element.

Figure 15:
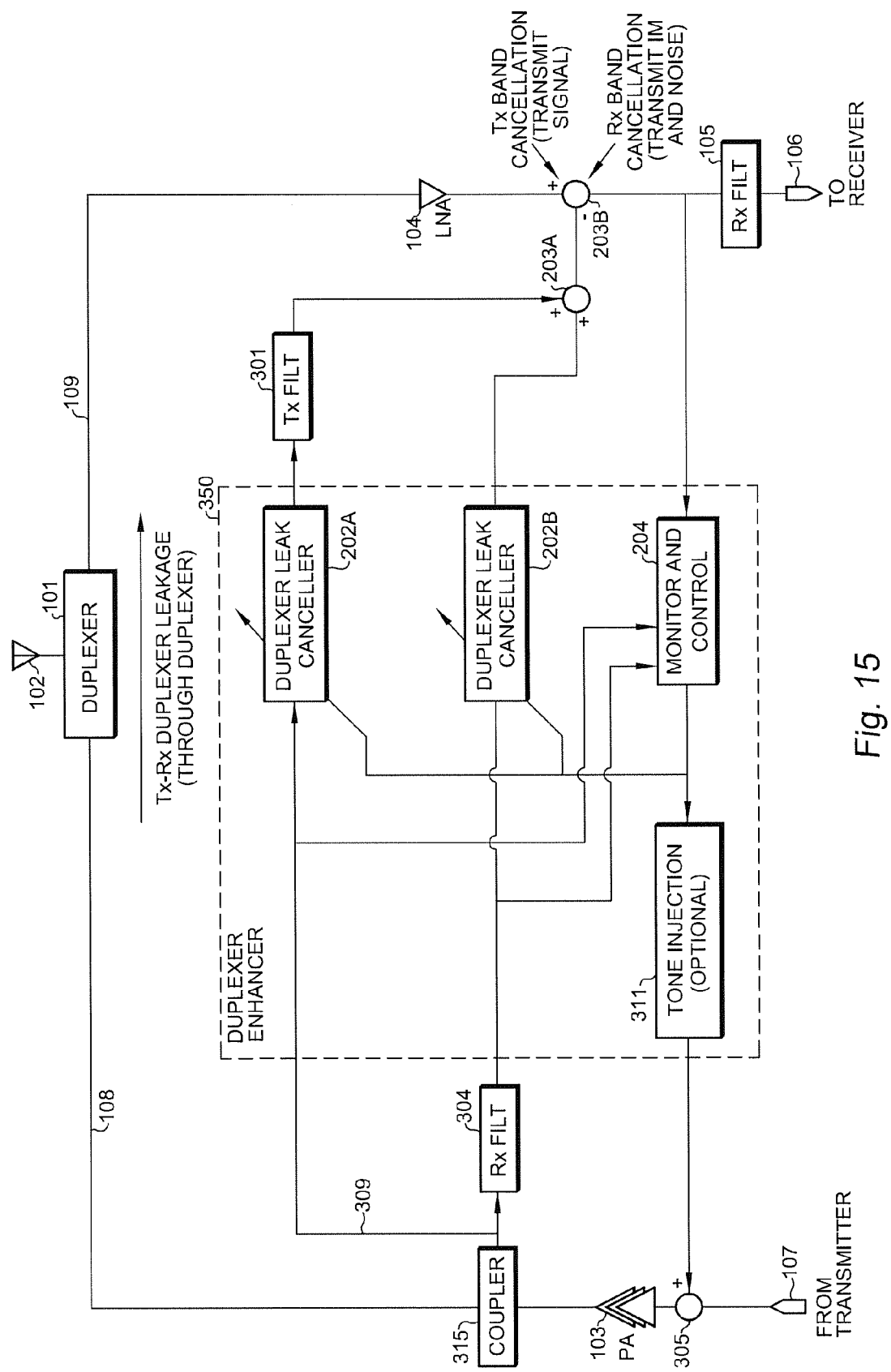
FIG. 15 shows transceiver duplexer circuit 1500 that includes filter enhancer circuit 350, in accordance with one embodiment of the present invention.

FIG. 15 shows transceiver duplexer circuit 1500 that includes filter enhancer circuit 350, in accordance with one embodiment of the present invention. In transceiver duplexer circuit 1500, the transmitter cancellation path and the receiver cancellation path are merged after LNA 104 when LNA 104 is sufficiently linear.

Figure 16:
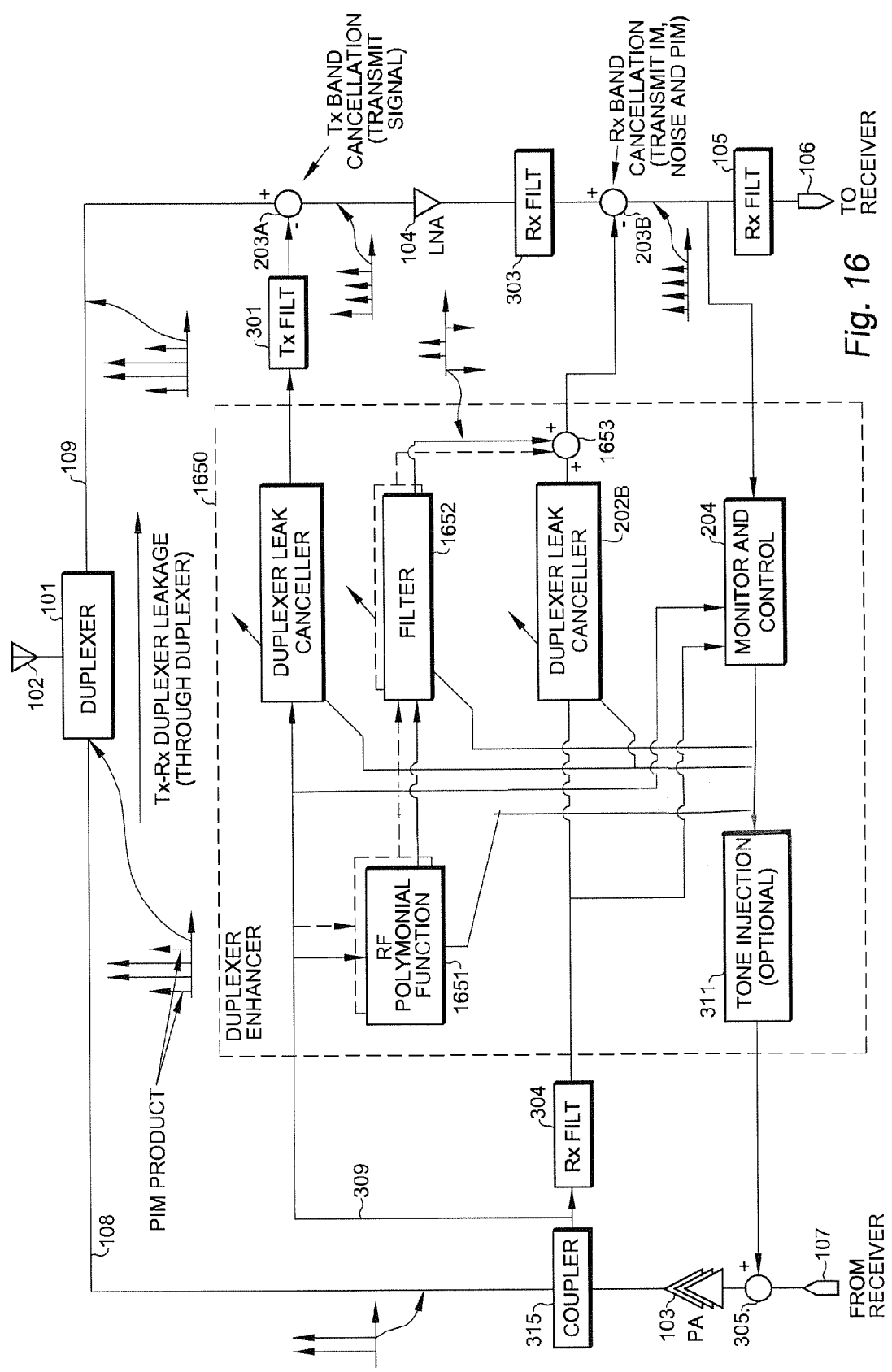
FIG. 16 shows transceiver duplexer circuit 1600 that includes filter enhancer circuit 1650, in accordance with one embodiment of the present invention.

Duplexers, connector and cables may suffer from passive intermodulation (PIM), which is often referred to as the "rusty bolt effect". Some of the causes for PIM are (a) contaminated surfaces or contacts due to dirt, dust, moisture or oxidation; (b) loose mechanical junctions due to inadequate torque, poor alignment or poorly prepared contact surfaces; (c) loose mechanical junctions caused during transportation, shock or vibration; and (d) metal flakes or shavings inside RF connection. FIG. 16 shows transceiver duplexer circuit 1600 that includes filter enhancer circuit 1650, in accordance with one embodiment of the present invention. Filter enhancer circuit 1650 includes RF polynomial function circuit 1651 that generates intermodulation products of the transmit signal. The coefficients of the polynomial function in RF polynomial function circuit 1651 are optimized by the monitor and control block 204. The output signal of RF polynomial function 1651 is filtered by filter circuit 1652 to match the duplexer response of duplexer 10. The filter signal of filter 1652 is summed at summer 1653 with the output signal of transmitter leakage canceller 202b. At summer 203b, passive intermodulation products the receiver input signal are cancelled. Additional RF polynomial function circuits and filter circuits may be replicated in parallel to RF polynomial function circuit 1651 and filter 1652 to compensate for additional sources of distortion (e.g., distortion in an antenna cable or from antenna PIM).

Figure 17:
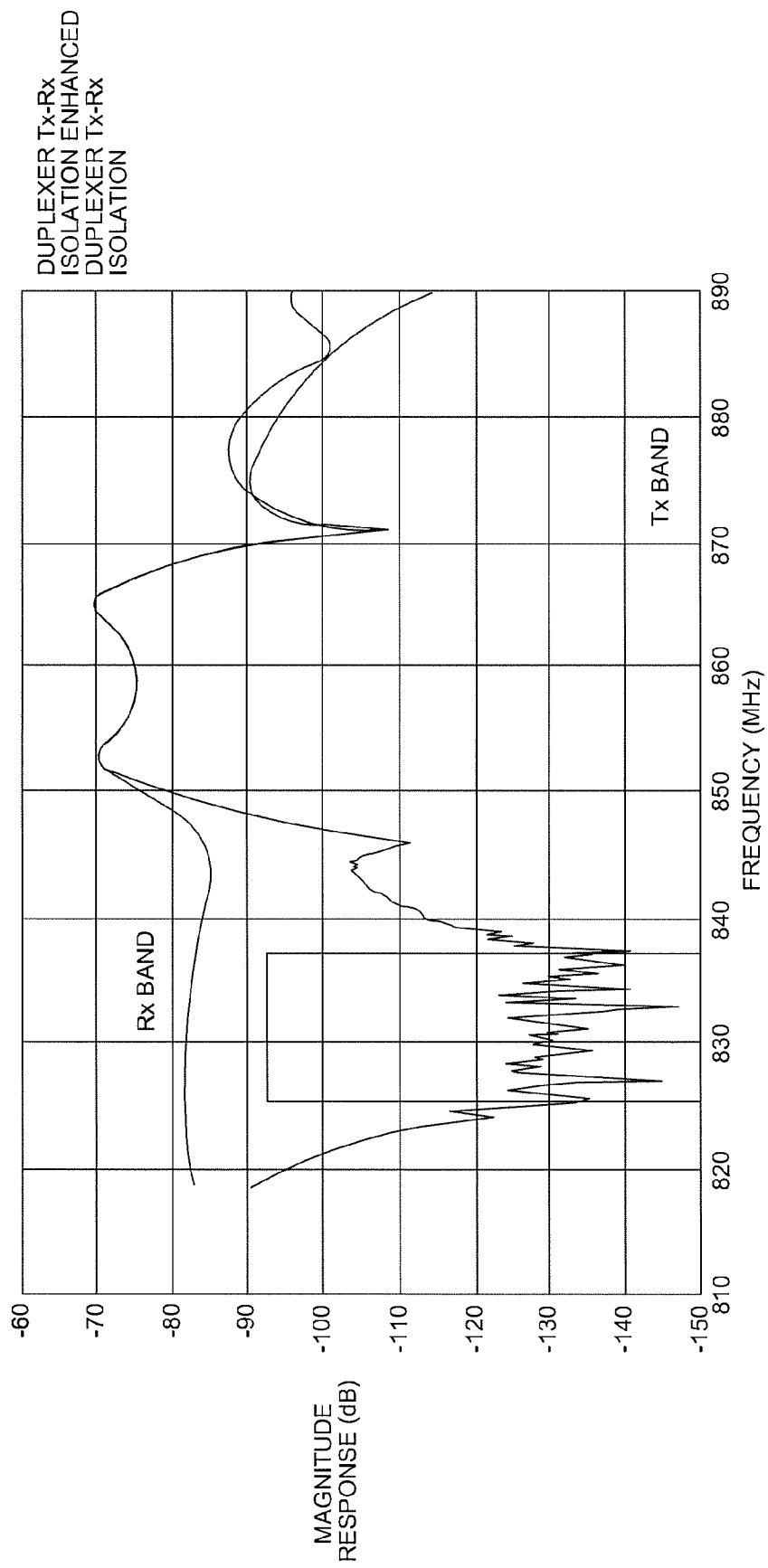
FIG. 17 shows simulation results of a transceiver duplexer circuit having a leakage canceller in the receiver frequency band, in accordance with one embodiment of the present invention.

FIG. 17 shows simulation result of a duplexer transceiver circuit having a leakage canceller in the receiver frequency band, in accordance with one embodiment of the present invention. As shown in FIG. 17, plot 1701 shows the transmitter-receiver isolation in a conventional duplexer. Plot 1702 shows an over 40 dB improvement in transmitter-receiver isolation in the receiver frequency band using a canceler circuit in a filter enhancer provided according to the present invention.

Figure 18:
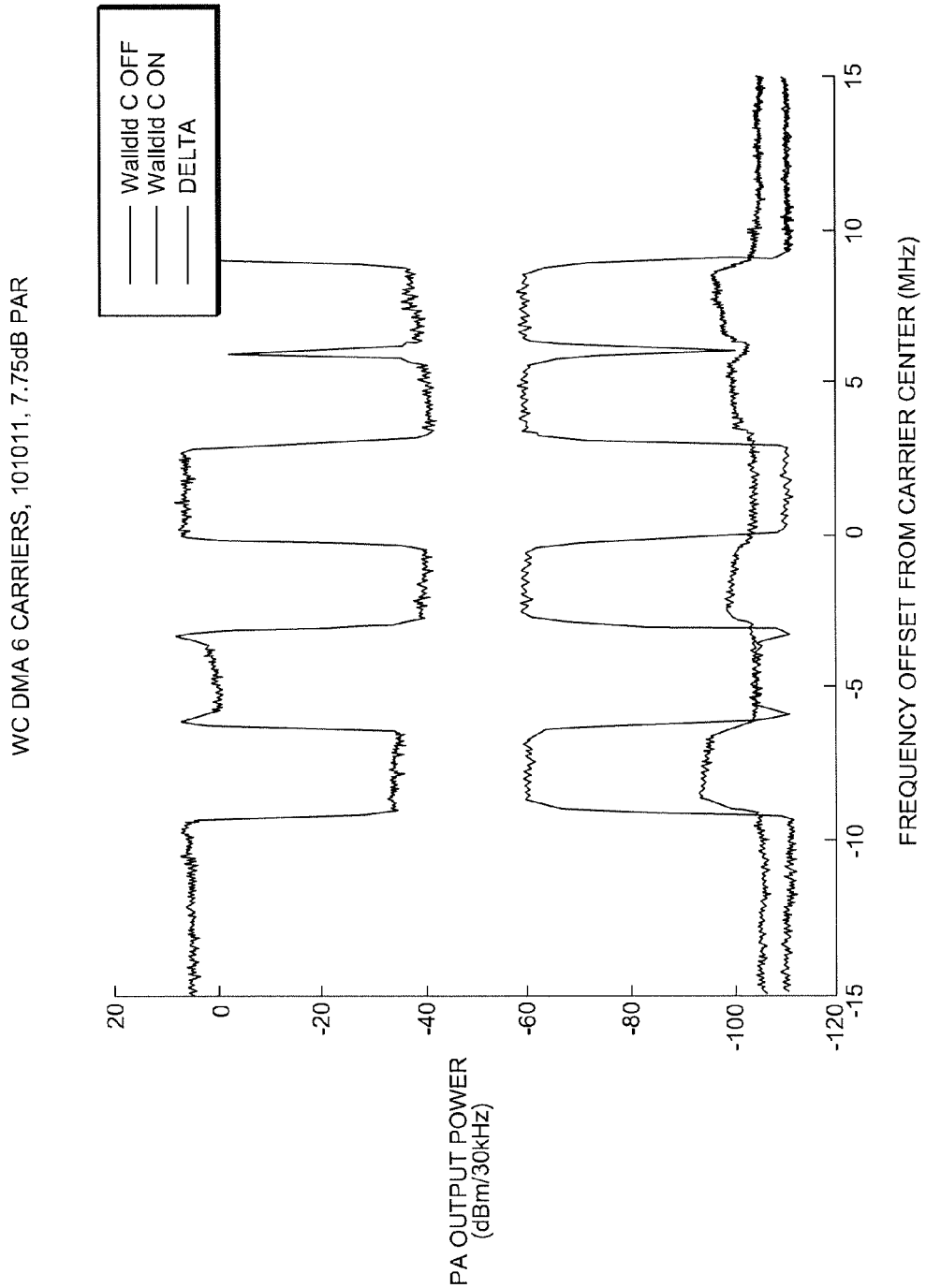
FIG. 18 shows laboratory measurements of a transceiver duplexer circuit having a direct leakage canceller circuit, in accordance with one embodiment of the present invention.

FIG. 18 shows laboratory measurements of a duplexer transceiver circuit having a direct leakage canceller circuit, in accordance with one embodiment of the present invention. In FIG. 18, waveform 1801 represents the output power of a power amplifier in a WCDMA application with six carrier signals. Waveform 1802 represents the transmitter-receiver isolation using cancellation circuits for duplexer transmitter-receiver isolation in the transmitter and receiver frequency bands, without direct leakage cancellation. Waveform 1803 represents the transmitter-receiver isolation using cancellation circuits for duplexer transmitter-receiver isolation in the transmitter and receiver frequency bands, with direct leakage cancellation. As shown in FIG. 18, direct leakage cancellation provides a 35 dB cancellation over a signal that is 30 MHz frequency offset from a center frequency.

Figure 19:
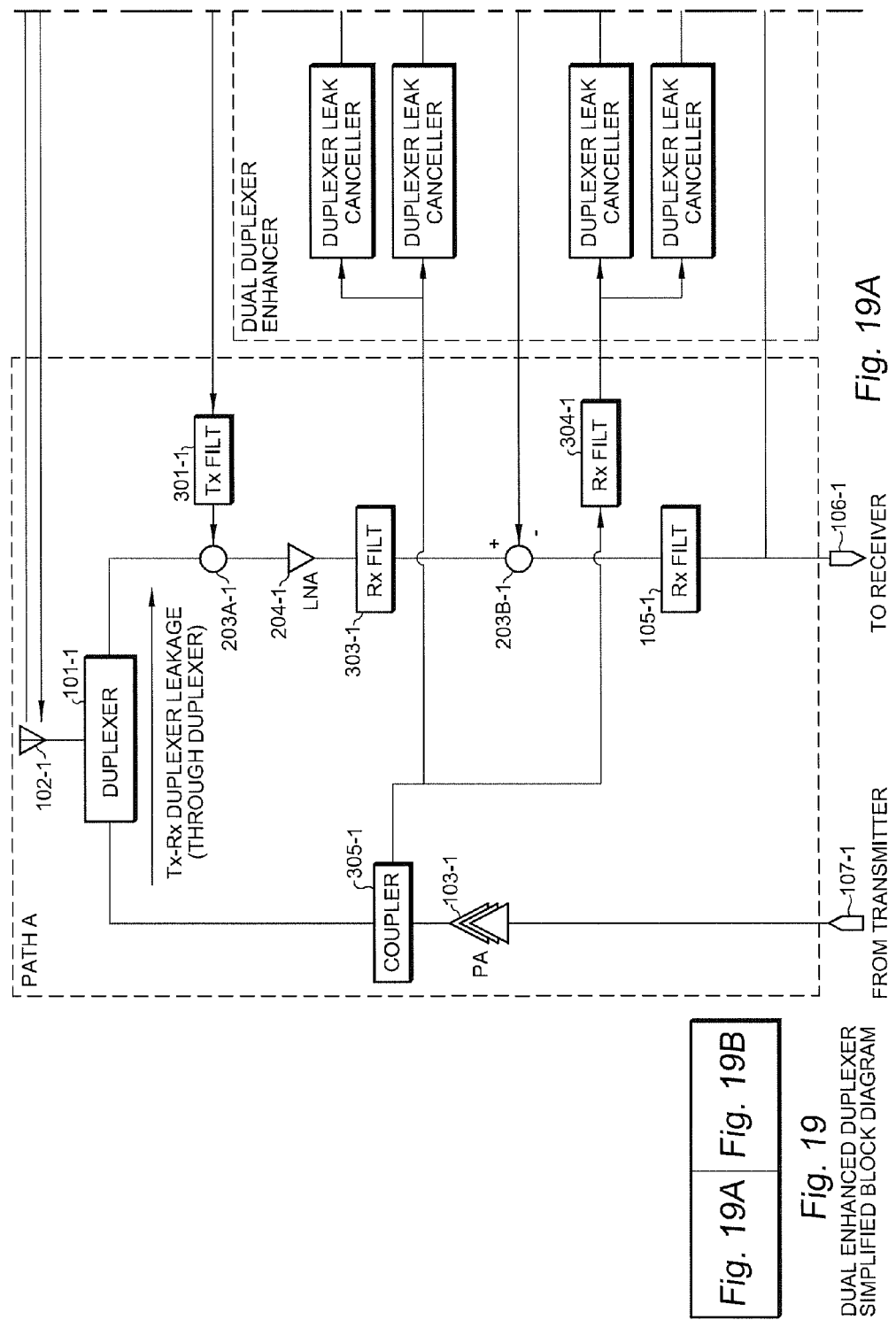
FIG. 19 shows using filter enhancer 1901 to cancel antenna-to-antenna coupling in a multi path configuration, according to one embodiment of the present invention.
Figure 19B:
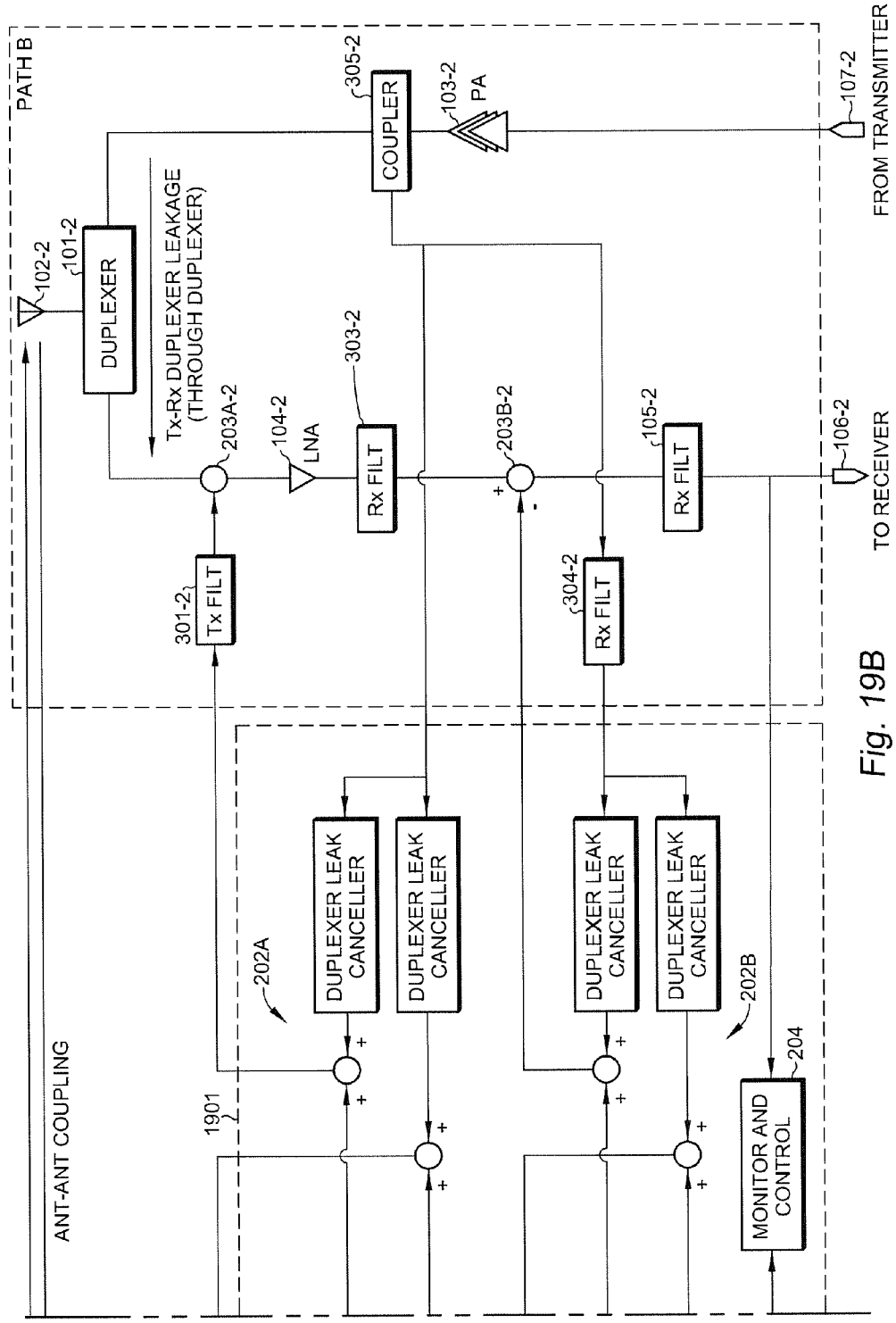

FIG. 19 shows using filter enhancer 1901 to cancel antenna-to-antenna coupling in a multi path configuration, according to one embodiment of the present invention. Filter enhancer 1901 may be used, for example, in a Multiple Inputs Multiple Output (MIMO) system. The MIMO system shown in FIG. 19, for example, includes the transmission paths through power amplifiers 103-1 and 103-2. According to one embodiment of the present invention, filter enhancer 1901 includes leakage cancellers 202a and 202b, respectively for leakage cancelling in the transmission band and in the receiver band, respectively. In this embodiment, however, in addition to cancelling the duplexer residual leakage in each transmitter and receiver signal paths, leakage cancellers 201a and 202b also cancel duplexer residual leakage from other transmission and receiver signal paths. For example, as shown in FIG. 19, leakage canceller 201a and 202b provide leakage cancellations in both the transmission paths of power amplifiers 103-1 and 103-2. Consequently, in the two-path arrangement shown in FIG. 19, the number of leakage cancellers required is doubled to provide antenna coupling cancellation. The principles explained herein may be applied to systems in which the number of paths is greater than two. The receiver demodulator information may be used to generate a cost function to drive the receiver band FIR filters coefficients adaptation.

The above detailed description is provided to illustrate specific embodiments of the present invention and is not intended to be limiting. Numerous modifications and variations within the scope of the present invention are possible. The present invention is set forth in the accompanying claims.

We claim:

1. A filter enhancer for a passive filter having an input terminal for receiving a signal in a first frequency band and an output terminal for providing a signal in a second frequency band, the filter enhancer comprises:
   a first canceller circuit coupled between the input terminal and the output terminal, the first canceller circuit including a first finite impulse response (FIR) filter for attenuating signals in the first frequency band;
   a control circuit coupled to the output terminal and the first canceller circuit for providing adaptively coefficients for configuring the first FIR filter;
   a second canceller circuit coupled between the input terminal and the output terminal, the second canceller circuit including a second FIR filter for attenuating signals in the second frequency band,
   wherein the passive filter comprises a duplexer,
   wherein the input terminal of the passive filter is coupled to a transmitter,
   wherein the output terminal of the passive filter is coupled to a receiver,
   wherein the first frequency band includes signals output from the transmitter, and
   wherein the second frequency band includes signals to be received into the receiver;
   a polynomial function circuit coupled to the input terminal of the passive filter for generating cancellation signals to passive intermodulation products;
   a filter for filtering the cancellation signals; and
   a summer for combining the filtered cancellation signals with signals at the output terminal of the passive filter.

2. The filter enhancer of claim 1, wherein the first FIR filter comprises a digital FIR filter.

3. The filter enhancer of claim 1, wherein the first FIR filter comprises an analog FIR filter.

4. The filter enhancer of claim 1, further comprising:
   a down-converter between the input terminal of the passive filter and the first canceller circuit, the down-converter down-converting a signal at the input terminal of the passive filter from a frequency in the first frequency band to an intermediate or baseband frequency; and
   an up-converter between the first canceller circuit and the output terminal of the passive filter, the up-converter converting an output signal from the first canceller circuit from the intermediate or baseband frequency to the frequency in the first frequency band.

5. The filter enhancer of claim 4, further comprising a phase-locked loop that provides a carrier signal having the frequency in the first frequency band.

6. The filter enhancer of claim 4, wherein the signal of the input terminal of the passive filter is provided as in-phase and quadrature signals.

7. The filter enhancer of claim 6, wherein the first canceller circuit comprises:
   a first sample-and-hold circuit for sampling the in-phase signal;

a second sample-and-hold circuit for sampling the quadrature signal;

a first cross-coupling circuit for adjusting the phases and amplitudes of the sampled in-phase signal and the sampled quadrature signal;

wherein the first (FIR) includes a first analog FIR filter for filtering the adjusted sampled in-phase signal to provide a filtered in-phase signal;

wherein the second FIR filter includes a second analog FIR filter for filtering the adjusted sampled quadrature signal to provide a filtered quadrature signal;

a first cross-coupled circuit for adjusting the phases and amplitudes of the filtered in-phase signal and the filtered quadrature signal;

a third sample-and-hold circuit for sampling the adjusted filtered in-phase signal; and a fourth sample-and-hold circuit for sampling the adjusted filtered quadrature signal.

8. The filter enhancer of claim 7, wherein the first analog FIR filter is implemented as a first switched-capacitor filter and the second analog FIR filter is implemented as a second switched-capacitor filter.

9. The filter enhancer of claim 6, wherein the first canceller circuit comprises:
    a first analog-to-digital circuit for sampling the in-phase signal;
    a second analog-to-digital circuit for sampling the quadrature signal;
    a first cross-coupling circuit for adjusting the phases and amplitudes of the sampled in-phase signal and the sampled quadrature signal;
    wherein the first (FIR) filter includes a first digital FIR filter for filtering the adjusted sampled in-phase signal to provide a filtered in-phase signal;
    wherein the second FIR filter includes a second digital FIR filter for filtering the adjusted sampled quadrature signal to provide a filtered quadrature signal;
    a first cross-coupled circuit for adjusting the phases and amplitudes of the filtered in-phase signal and the filtered quadrature signal;
    a first digital-to-analog circuit for converting the adjusted filtered in-phase signal into an analog in-phase signal; and
    a second digital-to-analog circuit for converting the adjusted filtered quadrature signal into an analog quadrature signal.

10. The filter enhancer of claim 1, further comprising:
    a second summer for combining output signals of the first canceller circuit with signals at the output terminal of the passive filter; and
    a low noise amplifier for amplifying the combined signals for output to the receiver.

11. The filter enhancer of claim 10, further comprising a transmit filter for the first frequency band between the first canceller circuit and the second summer.

12. The filter enhancer of claim 11, further comprising a receiver filter for the second frequency band between the output terminal of the passive filter and a third summer.

13. The filter enhancer of claim 1, further comprising a tone injection circuit controlled by the control circuit for injection of a tone into the input terminal of the passive filter.

14. The filter enhancer of claim 13, wherein the transmitter comprises a power amplifier, and wherein the tone injection circuit injects the tone for amplification by the power amplifier.

15. The filter enhancer of claim 1, wherein a transmit filter matches a delay between a signal path through the passive filter and a signal path through the first canceller circuit.

16. The filter enhancer of claim 15, wherein a receiver filter matches a delay between a signal path through the passive filter and a signal path through the second canceller circuit.

17. The filter enhancer of claim 16, further comprising a low noise amplifier between the transmit filter and the receiver filter.

18. The filter enhancer of claim 1, further comprising:
    a low noise amplifier for amplifying signals at the output terminal of the passive filter; and
    a second summer for combining output signals of the first and second canceller circuits with signals at the output terminal of the low noise amplifier.

19. The filter enhancer of claim 1, wherein the passive filter further comprises a second duplexer providing a second input terminal coupled to a second transmitter and a second output terminal coupled to a second receiver, the second transmitter provided for transmitting signals of a third frequency band and the second receiver provided for receiving signals of a fourth frequency band, and wherein the first canceller circuit further includes a third FIR filter for attenuating signals in the third frequency band; and the second canceller circuit further includes a fourth FIR filter for attenuating signals in the fourth frequency band.

20. The filter enhancer of claim 19, wherein a first signal path is provided between the second transmitter and the first receiver and a second signal path is provided between the first transmitter and the second receiver, wherein the first canceller circuit attenuates (i) signals within the third frequency band in the first signal path and (ii) signals within the first frequency band from the second signal path.

21. The filter enhancer of claim 19, wherein a first signal path is provided between the second transmitter and the first receiver and a second signal path is provided between the first transmitter and the second receiver, wherein the second canceller circuit attenuates (i) signals within the fourth frequency band in the first signal path and (ii) signals within the second frequency band from the second signal path.

22. The filter enhancer of claim 19, wherein demodulator information from the first and second receivers are used to generate a cost function to drive adaptation of coefficients of the FIR filters for the second and fourth frequency bands.

23. A filter enhancer for a passive filter having an input terminal for receiving a signal in a first frequency band and an output terminal for providing a signal in a second frequency band, the filter enhancer comprises:
    a first canceller circuit coupled between the input terminal and the output terminal, the first canceller circuit including a first finite impulse response (FIR) filter for attenuating signals in the first frequency band;
    a control circuit coupled to the output terminal and the first canceller circuit for providing adaptively coefficients for configuring the first FIR filter;
    a down-converter between the input terminal of the passive filter and the first canceller circuit, the down-converter down-converting a signal at the input terminal of the passive filter from a frequency in the first frequency band to an intermediate or baseband frequency;
    an up-converter between the first canceller circuit and the output terminal of the passive filter, the up-converter converting an output signal from the first canceller circuit from the intermediate or baseband frequency to the frequency in the first frequency band,
    wherein the signal of the input terminal of the passive filter is provided as in-phase and quadrature signals, and wherein the first canceller circuit comprises:
- a first sample-and-hold circuit for sampling the in-phase signal;
- a second sample-and-hold circuit for sampling the quadrature signal;
- a first cross-coupling circuit for adjusting the phases and amplitudes of the sampled in-phase signal and the sampled quadrature signal;
- wherein the first (FIR) includes:
  - a first analog FIR filter for filtering the adjusted sampled in-phase signal to provide a filtered in-phase signal; and
  - a second analog FIR filter for filtering the adjusted sampled quadrature signal to provide a filtered quadrature signal;
- a first cross-coupled circuit for adjusting the phases and amplitudes of the filtered in-phase signal and the filtered quadrature signal;
- a third sample-and-hold circuit for sampling the adjusted filtered in-phase signal; and
- a fourth sample-and-hold circuit for sampling the adjusted filtered quadrature signal.

24. The filter enhancer of claim 23, wherein the first analog FIR filter is implemented as a first switched-capacitor filter and the second analog FIR filter is implemented as a second switched-capacitor filter.

25. A filter enhancer for a passive filter having an input terminal for receiving a signal in a first frequency band and an output terminal for providing a signal in a second frequency band, the filter enhancer comprises:
- a first canceller circuit coupled between the input terminal and the output terminal, the first canceller circuit including a first finite impulse response (FIR) filter for attenuating signals in the first frequency band;
- a control circuit coupled to the output terminal and the first canceller circuit for providing adaptively coefficients for configuring the first FIR filter;
- a down-converter between the input terminal of the passive filter and the first canceller circuit, the down-converter down-converting a signal at the input terminal of the passive filter from a frequency in the first frequency band to an intermediate or baseband frequency;
- an up-converter between the first canceller circuit and the output terminal of the passive filter, the up-converter converting an output signal from the first canceller circuit from the intermediate or baseband frequency to the frequency in the first frequency band,
- wherein the signal of the input terminal of the passive filter is provided as in-phase and quadrature signals, and
- wherein the first canceller circuit comprises:
  - a first analog-to-digital circuit for sampling the in-phase signal;
  - a second analog-to-digital circuit for sampling the quadrature signal;
  - a first cross-coupling circuit for adjusting the phases and amplitudes of the sampled in-phase signal and the sampled quadrature signal;
  - wherein the first (FIR) filter includes:
    - a first digital FIR filter for filtering the adjusted sampled in-phase signal to provide a filtered in-phase signal; and
    - a second digital FIR filter for filtering the adjusted sampled quadrature signal to provide a filtered quadrature signal;
  - a first cross-coupled circuit for adjusting the phases and amplitudes of the filtered in-phase signal and the filtered quadrature signal;
  - a first digital-to-analog circuit for converting the adjusted filtered in-phase signal into an analog in-phase signal; and
  - a second digital-to-analog circuit for converting the adjusted filtered quadrature signal into an analog quadrature signal.

* * * * *

UNITED STATES PATENT AND TRADEMARK OFFICE
CERTIFICATE OF CORRECTION

| | | |
|---|---|---|
| PATENT NO. | : 9,306,618 B2 | Page 1 of 1 |
| APPLICATION NO. | : 14/028266 | |
| DATED | : April 5, 2016 | |
| INVENTOR(S) | : Olivier Charlon et al. | |

It is certified that error appears in the above-identified patent and that said Letters Patent is hereby corrected as shown below:

In the Specification:

Column 9, Line 16    Delete "10." and insert --101.--

Signed and Sealed this
Seventh Day of June, 2016

Michelle K. Lee
*Director of the United States Patent and Trademark Office*